US012298461B2

United States Patent
Kanakasabai et al.

(10) Patent No.: US 12,298,461 B2
(45) Date of Patent: May 13, 2025

(54) FOREIGN OBJECT DETECTION IN A WIRELESS POWER TRANSFER SYSTEM

(71) Applicant: GE Intellectual Property Licensing, LLC, Niskayuna, NY (US)

(72) Inventors: Viswanathan Kanakasabai, Bangalore (IN); Subbarao Tatikonda, Bangalore (IN); Jayanti Ganesh, Bangalore (IN); Joginder Yadav, Bangalore (IN); Suma Memana Narayana Bhat, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

(21) Appl. No.: 18/447,433

(22) Filed: Aug. 10, 2023

(65) Prior Publication Data

US 2023/0387727 A1    Nov. 30, 2023

Related U.S. Application Data

(63) Continuation of application No. 18/264,662, filed as application No. PCT/US2022/016543 on Feb. 16, 2022.

(30) Foreign Application Priority Data

Feb. 16, 2021   (IN) .............................. 202111006541

(51) Int. Cl.
*G01V 3/10*  (2006.01)
*H02J 50/10*  (2016.01)
(Continued)

(52) U.S. Cl.
CPC ................ *G01V 3/10* (2013.01); *H02J 50/10* (2016.02); *H02J 50/60* (2016.02); *H02J 50/70* (2016.02)

(58) Field of Classification Search
CPC .. G01V 3/10; H02J 50/10; H02J 50/60; H02J 50/70
(Continued)

(56) References Cited

U.S. PATENT DOCUMENTS

| 1,866,751 A | 7/1932 | Butow |
| 4,862,493 A | 8/1989 | Venkataraman et al. |

(Continued)

FOREIGN PATENT DOCUMENTS

| CN | 101394022 | 11/2012 |
| CN | 107306054 | 11/2020 |

(Continued)

OTHER PUBLICATIONS

"European Application No. 19788677.3 European Search Report", Nov. 23, 2021, 9 pages.

(Continued)

*Primary Examiner* — Hal Kaplan
(74) *Attorney, Agent, or Firm* — DeLizio, Peacock, Lewin & Guerra, LLP

(57) ABSTRACT

This disclosure provides systems, methods and apparatuses for foreign object detection (FOD) in a wireless power transfer (WPT) system. Some implementations relate generally to the use of detection coils that are excited to measure and compare a differential current through a coil pair that includes at least two detection coils. A foreign object may cause a change in impedance for one or more detection coils compared to one or more other detection coils. By detecting the differential current of the coil pair, a detection apparatus may determine that a foreign object is in proximity to one of the detection coils of the coil pair. This disclosure provides several options for the design, construction, layout, and operations of detection coils to improve foreign object detection.

20 Claims, 16 Drawing Sheets

(51) Int. Cl.
*H02J 50/60* (2016.01)
*H02J 50/70* (2016.01)

(58) Field of Classification Search
USPC ........................................................ 307/104
See application file for complete search history.

(56) References Cited

U.S. PATENT DOCUMENTS

| | | |
|---|---|---|
| 8,248,028 B2 | 8/2012 | Toya et al. |
| 9,178,361 B2 | 11/2015 | Liu et al. |
| 9,260,026 B2 | 2/2016 | Miller et al. |
| 9,404,954 B2 | 8/2016 | Roy et al. |
| 9,410,823 B2 | 8/2016 | Widmer et al. |
| 9,825,486 B2 | 11/2017 | Liu et al. |
| 10,361,594 B2 | 7/2019 | Huang |
| 10,371,848 B2 | 8/2019 | Roy et al. |
| 10,804,748 B2 | 10/2020 | Wu et al. |
| 11,685,269 B2 | 6/2023 | Kanakasabai |
| 2004/0003015 A1 | 1/2004 | Manor et al. |
| 2007/0214872 A1 | 9/2007 | Ammann et al. |
| 2009/0145778 A1 | 6/2009 | Allmendinger |
| 2010/0148907 A1 | 6/2010 | Younsi et al. |
| 2013/0099592 A1 | 4/2013 | Abe |
| 2013/0128396 A1 | 5/2013 | Danesh et al. |
| 2014/0015329 A1 | 1/2014 | Widmer et al. |
| 2014/0103733 A1 | 4/2014 | Irie et al. |
| 2014/0111019 A1 | 4/2014 | Roy et al. |
| 2014/0111154 A1 | 4/2014 | Roy et al. |
| 2014/0323844 A1 | 10/2014 | Deliwala et al. |
| 2014/0375256 A1 | 12/2014 | Lee et al. |
| 2015/0022012 A1 | 1/2015 | Kim et al. |
| 2015/0109000 A1 | 4/2015 | Sieber et al. |
| 2015/0137801 A1 | 5/2015 | Raedy et al. |
| 2015/0276965 A1 | 10/2015 | Turki |
| 2015/0311725 A1 | 10/2015 | Yamamoto et al. |
| 2016/0282500 A1 | 9/2016 | Filippenko et al. |
| 2016/0285312 A1 | 9/2016 | Maniktala |
| 2016/0336759 A1 | 11/2016 | Yamamoto et al. |
| 2017/0025904 A1 | 1/2017 | Roy et al. |
| 2017/0054333 A1 | 2/2017 | Roehrl et al. |
| 2017/0317536 A1 | 11/2017 | Marson et al. |
| 2017/0324252 A1 | 11/2017 | Yamamoto et al. |
| 2017/0328740 A1 | 11/2017 | Widmer et al. |
| 2017/0353061 A1 | 12/2017 | Maniktala |
| 2017/0363763 A1 | 12/2017 | Yamamoto et al. |
| 2018/0015832 A1 | 1/2018 | Nguyen et al. |
| 2018/0026482 A1 | 1/2018 | Asano et al. |
| 2018/0054091 A1 | 2/2018 | Liu et al. |
| 2018/0083349 A1 | 3/2018 | Seiber |
| 2018/0166928 A1 | 6/2018 | Wu et al. |
| 2018/0316229 A1 | 11/2018 | Anwer et al. |
| 2018/0366985 A1 | 12/2018 | Henkel et al. |
| 2019/0027973 A1 | 1/2019 | Baek et al. |
| 2019/0097471 A1 | 3/2019 | Pantic et al. |
| 2019/0103771 A1 | 4/2019 | Piasecki et al. |
| 2019/0331822 A1 | 10/2019 | Miyamoto |
| 2019/0363588 A1 | 11/2019 | Daetwyler et al. |
| 2020/0232819 A1 | 7/2020 | Widmer et al. |
| 2020/0266671 A1 | 8/2020 | Choi et al. |
| 2020/0290467 A1 | 9/2020 | Gao et al. |
| 2020/0328616 A1 | 10/2020 | Van Wageningen et al. |
| 2021/0078426 A1 | 3/2021 | Bhat et al. |
| 2021/0138917 A1 | 5/2021 | Kanakasabai et al. |
| 2021/0176571 A1 | 6/2021 | Snyder |
| 2021/0215845 A1 | 7/2021 | Tejeda et al. |

FOREIGN PATENT DOCUMENTS

| | | |
|---|---|---|
| EP | 3093958 | 11/2016 |
| JP | 2014126513 | 7/2014 |
| JP | 2015216828 | 12/2015 |
| JP | 2015223009 | 12/2015 |
| JP | 2016502385 | 1/2016 |
| JP | 2016134980 | 7/2016 |
| JP | 2016220523 | 12/2016 |
| KR | 1020180020166 | 2/2018 |
| KR | 20200064934 | 6/2020 |
| WO | 2011142419 | 11/2011 |
| WO | 2019057777 | 3/2019 |
| WO | 2019204376 | 10/2019 |
| WO | 2019204377 | 10/2019 |
| WO | 2019204379 | 10/2019 |
| WO | 2019219208 | 11/2019 |
| WO | 2022177948 | 8/2022 |

OTHER PUBLICATIONS

"India Application No. 201841014936 Examination Report", Jan. 29, 2020, 6 pages.
"India Application No. 201841014937 Examination Report", Jan. 21, 2020, 6 pages.
"Japan patent application No. 2020-556814 First Office Action", Feb. 15, 2023, 3 pages.
"PCT Application No. PCT/US2019/027787 International Preliminary Report on Patentability", Oct. 29, 2020, 8 pages.
"PCT Application No. PCT/US2019/027787 International Search Report", Aug. 9, 2019, 12 pages.
"PCT Application No. PCT/US2019/027789 International Search Report and Written Opinion", Aug. 7, 2019, 12 pages.
"PCT Application No. PCT/US2022/016543 International Search Report and Written Opinion", Aug. 11, 2022, 41 pages.
"PCT Application No. PCT/US2022/016543 Invitation to Pay Additional Fees and, Where Applicable, Protest Fee", May 23, 2022, 13 pages.
"U.S. Appl. No. 17/046,574 Office Action", Apr. 14, 2022, 20 pages.
"U.S. Appl. No. 17/048,424 Final Office Action", Sep. 16, 2022, 23 pages.
"U.S. Appl. No. 17/048,424 Non Final Office Action", Apr. 5, 2023, 24 pages.
"U.S. Appl. No. 17/048,424 Office Action", Jan. 21, 2022, 17 pages.
"India Application No. 202111006541 Examination Report", Feb. 5, 2024, 7 pages.
"Korea patent application No. 10-2020-7033326 Request for the Submission of an Opinion", Jan. 26, 2024, 2 pages.
"U.S. Appl. No. 17/048,424 Final Office Action", Jan. 5, 2024, 18 pages.
"U.S. Appl. No. 18/338,890 Non Final Office Action", Jan. 18, 2024, 26 pages.
"Japan Patent application No. 2023-191894 Notice of Allowance", Sep. 3, 2024, 2 pages.
"Korea application No. 10-2023-7029121 Request for Submission of Opinion", Jan. 6, 2025, 10 pages.
"China application No. 201980026147.9 First Office Action", Sep. 24, 2024.
"U.S. Appl. No. 18/264,662 Non Final Office Action", Oct. 18, 2024, 10 pages.
"U.S. Appl. No. 18/338,890 Final Office Action", Oct. 18, 2024, 32 pages.
"U.S. Appl. No. 18/447,538 Non Final Office Action", Nov. 8, 2024, 10 pages.

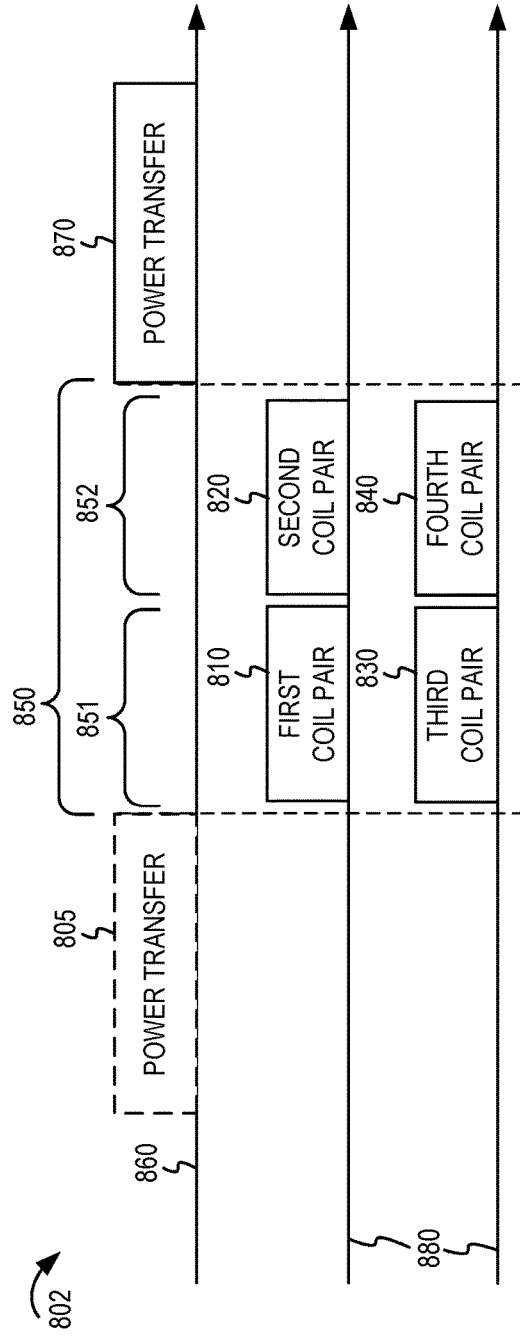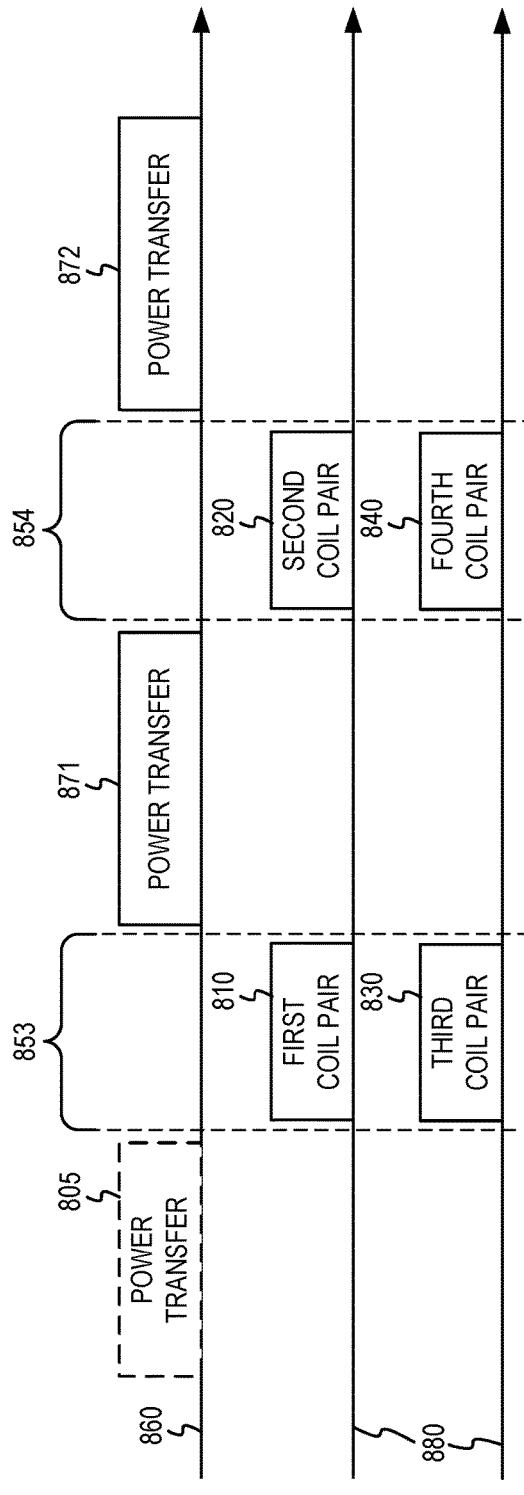

DETECTION COILS
MADE UP OF SUB COILS CONNECTED IN SERIAL

DETECTION COIL FEATURES
TO REDUCE EFFECT OF POWER TRANSFER COIL FIELD

FOREIGN OBJECT SCAN AREA
(TWO EXAMPLES)

FOREIGN OBJECT DETECTION IN A WIRELESS POWER TRANSFER SYSTEM

CROSS-REFERENCE TO RELATED APPLICATIONS

This Patent Application is a continuation of U.S. patent application Ser. No. 18/264,662, filed Aug. 8, 2023, which is a National Stage of International Application No. PCT/US2022/016543, filed Feb. 16, 2022, and claims the benefit of priority to India Non-Provisional Patent Application No. 202111006541, filed Feb. 16, 2021, entitled "FOREIGN OBJECT DETECTION IN A WIRELESS POWER TRANSFER SYSTEM," and assigned to the assignee hereof, the disclosures of which are incorporated by reference in this Patent Application.

TECHNICAL FIELD

This disclosure relates generally to wireless power. More specifically, this application relates to foreign object detection in a wireless power transfer system.

DESCRIPTION OF RELATED TECHNOLOGY

Technology has been developed to enable the wireless transmission of power from a wireless power transmission apparatus to a wireless power reception apparatus. Examples of a wireless power reception apparatus may include some types of mobile devices, small electronic devices, computers, tablets, gadgets, appliances (such as cordless blenders, kettles, or mixers), and some types of larger electronic devices, among other examples. Wireless power transmission may be referred to as a contactless power transmission or a non-contact power transmission. The wireless power may be transferred using inductive coupling or resonant coupling between a primary coil of the wireless power transmission apparatus and a secondary coil of the wireless power reception apparatus. For example, a wireless power transmission apparatus may include a primary coil that produces an electromagnetic field. The electromagnetic field may induce an electromotive force in a secondary coil of a wireless power reception apparatus when the secondary coil is placed in proximity to the primary coil. In this configuration, the electromagnetic field may wirelessly transfer power to the secondary coil.

In a wireless power transfer system, when a foreign metal object (such as a key, a coin, a metallic can, or aluminum foil, among other examples) is in proximity of the electromagnetic field, the foreign metal object may be undesirably heated up due to eddy currents. This may result in safety hazards, such as fire safety hazards. Furthermore, the efficiency of wireless power transfer process may be inadvertently affected or disrupted. Traditional techniques for detecting foreign objects in a wireless power transfer system may be inadequate or ineffective to prevent such safety hazards.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as a detection apparatus of a wireless power transfer (WPT) system. The detection apparatus may include a plurality of detection coils including at least a first detection coil and a second detection coil. The detection apparatus may include a first driver configured to concurrently excite the first detection coil and the second detection coil during a first foreign object detection (FOD) period. The detection apparatus may include a differential current sensing apparatus configured to detect a first differential current associated with the first detection coil and the second detection coil during the FOD period. The detection apparatus may include a control unit configured to generate a foreign object detection signal based, at least in part, on the first differential current.

Another innovative aspect of the subject matter described in this disclosure can be implemented as a detection apparatus of a WPT system. The detection apparatus may include a plurality of detection coils arranged to form a FOD scan area that is at least a threshold size larger than a potential combined surface area of a plurality of power transfer coils of a WPT system. The detection apparatus may include a control unit configured to generate a foreign object detection signal based, at least in part, on a detection of a foreign object in the FOD scan area.

Another innovative aspect of the subject matter described in this disclosure can be implemented as a WPT system. The WPT system may include a wireless power transmission apparatus including at least one primary coil and a first plurality of detection coils arranged to form a first FOD scan area that is at least a first size larger than a size of the primary coil. The WPT system may include a wireless power reception apparatus including at least one secondary coil and a second plurality of detection coils arranged to form a second FOD scan area that is at least a second size larger than a size of the secondary coil.

Another innovative aspect of the subject matter described in this disclosure can be implemented as a method of a detection apparatus of a WPT system. The method may include concurrently exciting at least a first detection coil and a second detection coil during a first FOD period. The method may include detecting, by a differential current sensing apparatus, a first differential current associated with the first detection coil and the second detection coil during the FOD period. The method may include generating a foreign object detection signal based, at least in part, on the first differential current.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

FIG. 8B shows another example timing diagram for a detection apparatus having multiple coil pairs.

FIG. 8C shows another example timing diagram for a detection apparatus having multiple coil pairs.

Like reference numbers and designations in the various drawings indicate like elements.

DETAILED DESCRIPTION

Figure 1:
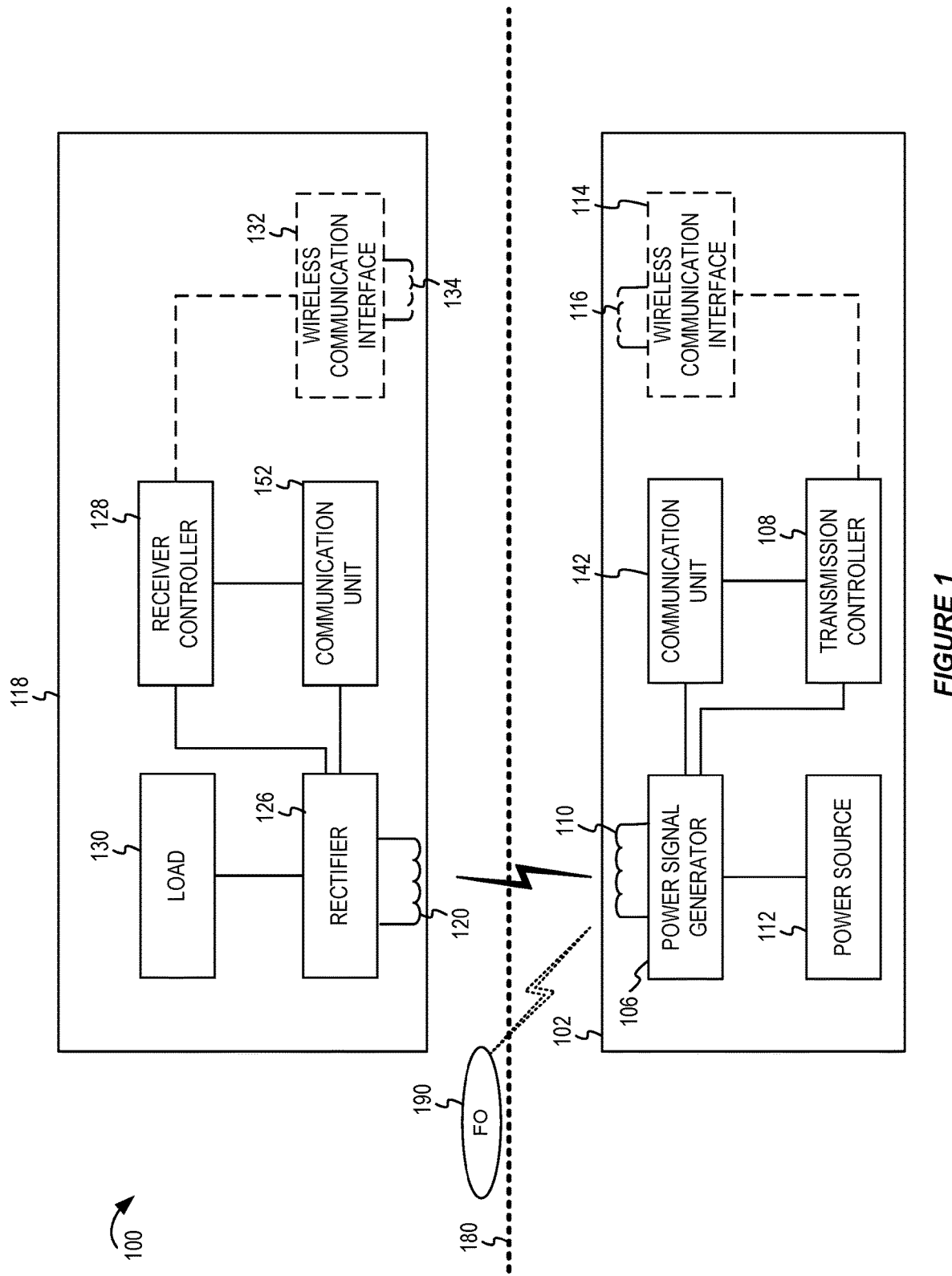
FIG. 1 shows a block diagram of an example wireless power transfer system.

A wireless power transfer (WPT) system may include a wireless power transmission apparatus and a wireless power reception apparatus. The wireless power transmission apparatus may include one or more primary coils that transmit wireless energy (as a wireless power signal) to one or more corresponding secondary coils in the wireless power reception apparatus. A primary coil refers to a source of wireless energy (such as inductive or magnetic resonant energy producing an electromagnetic field) in the wireless power transmission apparatus. A secondary coil located in the wireless power reception apparatus may receive the wireless energy via the electromagnetic field. Occasionally, a foreign object (sometimes referred to as a foreign metal object) may be in proximity to the electromagnetic field. A foreign object may be any object that is electrically conductive or has detectable magnetic permeability and that is not part of a WPT system but is inadvertently present in an operative environment of the WPT system. Non-limiting examples of foreign objects may include a ferrous object, a metallic can, a coin, a metal spoon, a key, aluminum foil, or other electrically conductive or ferrous objects. When a foreign object is in proximity to the electromagnetic field, the foreign object may negatively impact the wireless power transfer or may become undesirably heated up due to eddy currents.

There are a variety of techniques for detecting foreign objects in wireless power transfer systems. Some techniques may include detecting presence of a foreign object based on a variation in frequency of the current in a primary coil, detecting imbalanced disparities in current and voltages in the primary coil, power loss accounting based on measurements of power drawn from the primary coil, and the like. In some of the detection techniques there may be some delay in detection of the foreign objects after the wireless power transfer is initiated. The foreign object may absorb energy from a wireless power signal during this period which may result in wastage of power or unsafe heating. As WPT systems are being developed for higher amounts of power, there is an increased potential risk of foreign objects rapidly heating to unsafe temperatures.

This disclosure provides systems, methods and apparatuses for foreign object detection (FOD) in a wireless power transfer system. Some implementations relate generally to the use of detection coils in a detection apparatus (such as a detection mat or integrated with component of the WPT system). A pair of detection coils may be excited during an FOD period to measure and compare a differential current through the pair of detection coils. The differential current may be a result of a difference in impedance associated with one detection coil as a result of the presence of the foreign object in the operative environment of the WPT system. For example, the foreign object may cause a change in impedance for one or more detection coils compared to one or more other detection coils. As a result of the different impedance, the various detection coils may draw different amounts of current when they are energized. For brevity, this disclosure includes a description of a coil pair that includes at least two detection coils. The difference in the amounts of current associated with detection coils of a coil pair may be referred to as a differential current. By detecting the differential current of the coil pair, a detection apparatus may determine that a foreign object is in proximity to one of the detection coils of the coil pair. In addition to the description of foreign object detection based on differential current, this disclosure provides several options for the design and layout of detection coils to improve foreign object detection. Furthermore, this disclosure provides example circuit design options, layout design options, detection coil design options, and techniques to improve foreign object detection. For example, some of the provided design options may improve the accuracy of foreign object detection using unique detection coil designs and comparison of differential currents associated with different coil pairs in a detection apparatus. A movement of a wireless power reception apparatus during wireless power transfer may cause a change in impedance even in the absence of a foreign object. Advantageously, some techniques of this disclosure can distinguish the changes in impedance caused by a foreign object versus those caused by movement of the wireless power reception apparatus.

A coil pair refers to two or more detection coils that can be concurrently excited (also referred to as energized) during an FOD period. The two or more detection coils may be located in respective foreign object detection zones (referred to as "detection zones" for brevity) in an interface space of the WPT system. In some implementations, the detection zones may be symmetrically located with regard to a primary magnetic field of the WPT system. For example, the detection zones may cover a scan area relative to a primary coil of a wireless power transmission apparatus. In some implementations, the detection zones may be symmetrically located with regard to a secondary coil of a wireless power reception apparatus. Alternatively, or additionally, the detection zones be located relative to both the primary coil and the secondary coil. A primary magnetic field refers to a magnetic field that is induced by a transmitter unit, such as the wireless power transmission apparatus of the WPT system. The detection coils may be in a detection apparatus (such as a detection mat or other device) constructed for use in the primary magnetic field. For example, a detection apparatus may be used in an interface space between a wireless power transmission apparatus and a wireless power reception apparatus. In some implementations, the detection apparatus can be a part of the wireless power transmission apparatus. In some implementations, the detection apparatus can be a part of the wireless power reception apparatus. In some implementations, the detection apparatus can be a stand-alone device that is independent of the wireless power transmission apparatus and wireless power reception apparatus.

The coil pair may be coupled in a parallel circuit to a driver that concurrently excites the detection coils of the coil pair using a high frequency signal (such as 200 kHz or greater, as an example) during the FOD period. The differential current for that coil pair may be measured during the FOD period. A detection apparatus may have several such coil pairs and measure respective differential currents for the coil pairs. This disclosure includes example layouts of the detection coils in detection zones such that non-adjacent coil pairs can be excited at the same time in some implementations. Alternatively, each coil pair may be excited during different FOD periods to prevent cross-interference. By measuring the differential current associated with each coil pair and comparing the various differential currents for the coil pairs, the detection apparatus may determine whether a foreign object is present. And, in some implementations, the detection apparatus may determine a location of the foreign object in relation to one or more coil pairs.

In some implementations, a differential current sensing apparatus may be used to determine the differential current associated with the coil pair. For example, differential current sensing apparatus may generate a detection voltage (or other detectable output value) having a magnitude that increases as the differential current of the coil pair increases, and vice versa. This disclosure describes an example differential current sensing apparatus that includes a magnetic core (such as a toroid) and a differential current sensing circuit. One leg of each detection coil of the coil pair may pass through the magnetic core in opposite directions. The currents associated with the detection coils generate a flux linkage with the magnetic core. When the currents of the detection coils are the same or similar, their flux linkages may cancel (or nearly cancel) each other such that the combined flux generated in the magnetic core is low. When the currents are dissimilar (indicative of a greater differential current), a higher combined flux is generated in the magnetic core.

In some implementations, the differential current sensing circuit may include a sensor coil wrapped around the magnetic core. The magnetic flux generated in the magnetic core may induce an electrical voltage signal in the differential current sensing circuit. That electrical signal may be rectified and filtered to produce a direct current voltage (referred to as a detection voltage) having a magnitude dependent on the differential current in the detection coils. Thus, for every coil pair, a detection voltage may represent the differential current in those coil pairs during the FOD period.

In some implementations, a detection apparatus may include multiple coil pairs dispersed in detection zones. In some implementations, the detection zones may be non-overlapping (or only partially overlapping) and symmetrically located with regard to a primary magnetic field of the WPT system. For example, a circular detection area (also referred to as a scan area) may be divided into detection zones having a sector shape relative to a circular detection area. A detection apparatus may control which coil pair is excited during each FOD period. For example, the detection apparatus may excite each coil pair in a different FOD period. Alternatively, the detection apparatus may excite more than one coil pair that are in non-adjacent detection. Thus, the detection apparatus may prevent an adjacent detection coil from interfering with the differential current measurement for a particular coil pair in each FOD period.

In some implementations, the detection apparatus may determine the detection voltages (corresponding to differential currents) associated with multiple coil pairs. Typically, a wireless power reception apparatus is large enough that it will simultaneously span multiple coil pairs. Conversely, a foreign object may be smaller than the wireless power reception apparatus. A foreign object may span only one coil pair or may span two coil pairs. The detection apparatus can distinguish between a movement of the wireless power reception apparatus versus introduction of a foreign object based on how many coil pairs have a change in differential current. For example, when the detection voltages for multiple coil pairs of a threshold quantity indicate a change in differential currents, the detection apparatus may determine that such change is a result of a movement of the wireless power reception apparatus. When the detection voltages for one coil pair (or below the threshold quantity) indicate a change in differential current, the detection apparatus may determine that such change is a result of the introduction of a foreign object. In some implementations, the detection apparatus may modify or offset the detection voltages for multiple coil pairs in response to determining that a movement of the wireless power reception apparatus has occurred. Thus, for a subsequent comparison of the detection voltages, the detection apparatus can adjust the detection voltages to account for a current location of the wireless power reception apparatus within the magnetic field of the WPT system. Thus, the accuracy of a subsequent FOD procedure can be improved by accounting for the normal impedance impact of the wireless power reception apparatus while still providing an accurate technique for detecting a foreign object introduced during wireless power transfer.

This disclosure provides example designs for detection coils used in a detection apparatus. For example, the provided options for size, shape, construction, and location of the detection coils may improve the accuracy of the foreign object detection based on differential current. A size of the detection coils may be selected based on the disparate differences in sizes of a wireless power reception apparatus and a foreign object having a relatively smaller size compared to the wireless power reception apparatus. In some implementations, the size and shape of the detection coils of each coil pair may be uniform thereby normalizing the differences in impedance of the coils themselves. In some implementations, the detection coils may be constructed with a capacitance to increase the impedance of the detection coils for a power transfer frequency (such as 50 kHz) while offering low impedance when the detection coils are excited at a higher frequency (such as 200 kHz or greater).

In some implementations, the coil pairs may be structured for use in a polygon or circle shaped scan area. For example, the detection coils may have a triangular or sector shape such that when they are placed in their respective non-overlapping detection zones, they form the polygon or circle shaped scan area. In some implementations, some coil pairs may be structured to prevent a narrow detection area at the center of the scan area, while other coil pairs may be structured with a larger detection area to cover the center area of the scan area. For example, the detection coils of one or more coil pairs may have a triangular or sector shape with an additional portion to cover the center area, while the detection coils of other coil pairs may have a trapezoidal or annulus sector shape to fill the remaining portions of the polygon or circle shaped scan area.

In some implementations, each detection coil may be constructed as a collection of smaller sub coils connected in series to form a single detection coil. The size of the smaller sub coils enables the detection coil to better capture the impedance impact of a smaller foreign object. Furthermore, in some implementations, the sub coils may be wound in opposite directions so that the primary magnetic field of the WPT system (such as during a wireless power transfer) will induce less or no voltage in the detection coil as a whole. Thus, the detection apparatus may stay in the primary magnetic field during wireless power transfer between the wireless power transmission apparatus and the wireless power reception apparatus. The voltage induced in the sub coils by the primary magnetic field may cancel each other out or reduce the overall voltage induced in the detection coil.

This disclosure describes the use of detection coils in an FOD scan area. In some implementations, the size of the FOD scan area may be larger than a combined surface area of the power transfer coils of the WPT system. For example, a primary coil of a wireless power transmission apparatus may have a first diameter and a secondary coil of a wireless power reception apparatus may have a second diameter. An optimal placement of the wireless power reception apparatus and the wireless power transmission apparatus may be when the center of the primary coil and the secondary coil are perfectly aligned. However, such is not always the case in an actual operating environment. A WPT system may permit a misalignment tolerance where the secondary coil and the primary coil are misaligned but may still be capable of wireless power transfer. Meanwhile, a foreign object may be introduced in an area just outside the surface areas of a misaligned primary coil and secondary coil. Even in that location, the foreign object may absorb energy from the primary magnetic field during wireless power transfer and reduce the efficiency of the wireless power transfer or heat to dangerous temperatures. Thus, in some implementations, the FOD scan area may be a threshold size larger than a combined surface area of the power transfer coils taking into account the misalignment tolerance. In some implementations, the FOD scan area may have a diameter that is at least 10% larger than the larger of the primary coil diameter and the secondary coil diameter. In some implementations, the FOD scan area may have a diameter that is at least 10% larger than the larger power transfer coil plus the misalignment tolerance permitted by the WPT system.

In some implementations, the FOD scan area may be dynamically determined based on characteristics of the primary coil, the secondary coil, their current alignment, or any combination thereof. For example, in a detection apparatus having multiple detection zones, the detection zones may be dynamically selected or disabled based on the current operating conditions. The dynamic FOD scan area size may be based at least a threshold size greater (such as 10% larger diameter or 20% larger radius) than the potential combined surface area or footprint of the power transfer coils plus the misalignment tolerance.

In some implementations, a detection apparatus may include two parts such that a first part detects foreign objects in relation to a primary coil of a wireless power transmission apparatus and a second part detects foreign objects in relation to a secondary coil of a wireless power reception apparatus. Each of the parts may detect foreign objects in an FOD scan area that is at least a threshold size greater than a diameter of their respective power transfer coils. In such a configuration, even when the primary coil and the secondary coil are misaligned, the detection apparatus may detect foreign objects in a primary magnetic field relative to the primary coil and the secondary coil. Although described as two parts of a detection apparatus, in some implementations, each part may be constructed as separate detection mats. For example, a first detection mat may be constructed, attached or integrated with a wireless power transmission apparatus and a second detection mat may be constructed, attached or integrated with a wireless power reception apparatus.

Particular implementations of the subject matter described in this disclosure can be implemented to realize one or more of the following potential advantages. A detection apparatus can detect foreign objects before wireless power transfer or in FOD periods during wireless power transfer. The techniques of this disclosure advantageously minimize impact of the detection apparatus on the wireless power transfer, and vice versa. Furthermore, the example detection coil design in this disclosure advantageously enables accurate foreign object detection using differential currents in a coil pair. The example layout of detection zones may enable fast and accurate detection of the foreign objects in an FOD scan area. The FOD scan area may be of a size sufficient to ensure that a foreign object at a peripheral of a wireless power transfer does not heat beyond a safe level.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for wireless power transfer.

FIG. 1 shows a block diagram of an example wireless power transfer system 100.

The wireless power transfer system may include a wireless power transmission apparatus 102 and a wireless power reception apparatus 118. The wireless power transmission apparatus includes a primary coil 110. The primary coil 110 may be associated with a power signal generator 106. The primary coil 110 may be a wire coil which transmits wireless power (which also may be referred to as wireless energy). The primary coil 110 may transmit wireless energy using inductive or magnetic resonant field. Together, the power signal generator and the primary coil may generate a primary magnetic field during wireless power transfer. The power signal generator 106 may include components (not shown) to provide power to the primary coil 110 causing the primary coil 110 to produce the wireless power signal. For example, the power signal generator 106 may include one or more switches, drivers, series capacitors, rectifiers or other components. The wireless power transmission apparatus 102 also may include a transmission controller 108 that controls the components of the power signal generator 106. For example, the transmission controller 108 may determine an operating point (such as voltage or current) and control the power signal generator 106 according to the operating point.

In some implementations, the power signal generator 106, the transmission controller 108 and other components (not shown) may be collectively referred to as a power transmitter circuit. Some or all of the power transmitter circuit may be embodied as an integrated circuit (IC) that implements features of this disclosure for controlling and transmitting wireless power to one or more wireless power reception apparatuses. The transmission controller 108 may be implemented as a microcontroller, dedicated processor, integrated circuit, application specific integrated circuit (ASIC) or any other suitable electronic device.

A power source 112 may provide power to the power transmitter circuit in the wireless power transmission apparatus 102. The power source 112 may convert alternating current (AC) power to direct current (DC) power. For example, the power source 112 may include a converter that receives an AC power from an external power supply (such as a supply mains) and converts the AC power to a DC power used by the power signal generator 106.

In some implementations, a first communication unit 142 may be coupled to the components of the power signal generator 106 or the primary coil 110 to send or receive communications via the wireless power signal. The first communication unit 142 may include logic for controlling one or more switches and other components that cause transmission and reception of wireless signals via the wireless power signal. For example, the first communication unit 142 may include modulators or demodulators that convert information to modulated signals added to the wireless power signal. In one example, the first communication unit 142 may convert data from the transmission controller 108 into a frequency shift key (FSK) modulated signal that is combined with the wireless power signal for a communication from the wireless power transmission apparatus 102 to the wireless power reception apparatus 118. In another example, the first communication unit 142 may sense load modulated amplitude shift key (ASK) signals from the power signal generator 106 or the primary coil 110 and demodulate the ASK signals to obtain data that the first communication unit 142 provides to the transmission controller 108.

In some implementations, the wireless power transmission apparatus 102 may include a wireless communication interface 114. The wireless communication interface 114 may be connected to a first communication coil 116 (which may be a coil or a loop antenna). The wireless communication interface 114 may include logic for controlling one or more switches and other components that cause transmission and reception of wireless communication signals via the first communication coil 116. In some implementations, the wireless communication interface 114 may support short range radio frequency communication (such as Bluetooth™) or Near-Field Communication (NFC). NFC is a technology by which data transfer occurs on a carrier frequency of 13.56 MHz. The wireless communication unit 114 also may support any suitable communication protocol.

The transmission controller 108 may detect the presence or proximity of a wireless power reception apparatus 118. In some implementations, the presence or proximity of the wireless power reception apparatus 118 may be detected based on a load change in response to a periodic low power signal generated by the power signal generator 106 and the primary coil 110. In some implementations, the presence or proximity of the wireless power reception apparatus 118 may happen during a periodic pinging process of the wireless communication interface 114 in the wireless power transmission apparatus 102.

The transmission controller 108 may control characteristics of wireless power that the wireless power transmission apparatus 102 provides to the wireless power reception apparatus 118. After detecting the wireless power reception apparatus 118, the transmission controller 108 may receive information from a wireless power reception apparatus 118. For example, the transmission controller 108 may receive the information during a hand shaking process with the wireless power reception apparatus 118. The information may include information about the wireless power reception apparatus 118 (such as a power rating, the manufacturer, the model, or parameters of the receiver when operating on a standard transmitter, among other examples). The transmission controller 108 may use this information to determine at least one operating control parameter (such as frequency, duty cycle, voltage, etc.) for wireless power it provides to the wireless power reception apparatus 118. To configure the wireless power, the transmission controller 108 may modify the frequency, duty cycle, voltage or any other suitable characteristic of the power signal generator 106.

The wireless power reception apparatus 118 may include a secondary coil 120, a rectifier 126, and a receiver controller 128. When the secondary coil 120 is aligned to the primary coil 110, the secondary coil 120 may generate an induced voltage based on a received wireless power signal from the primary coil 110. A capacitor may be in series between the secondary coil 120 and the rectifier 126. The rectifier 126 may rectify the induced voltage and provide the induced voltage to a load 130. In some implementations, the load 130 may be external to the wireless power reception apparatus 118 and coupled via electrical lines from the rectifier 126.

A receiver controller 128 may be connected to the rectifier 126 and a second communication unit 152. The second communication unit 152 may be coupled to the components of the secondary coil 120 or the rectifier 126 to send or receive communications via the wireless power signal. The second communication unit 152 may include logic for controlling one or more switches and other components that cause transmission and reception of communication signals via the wireless power signals. For example, the second communication unit 152 may include modulators or demodulators that convert information to ASK or FSK modulated signals. In one example, the second communication unit 152 may convert data from the receiver controller 128 into an ASK modulated signal that used to load modulate the wireless power signal for a communication from the wireless power reception apparatus 118 to the wireless power transmission apparatus 102. In another example, the second communication unit 152 may sense FSK signals in the wireless power signal at the secondary coil 120 or the rectifier 126 and demodulate the FSK signals to obtain data that the second communication unit 152 provides to the receiver controller 128.

In some implementations, the wireless power reception apparatus 118 may include a wireless communication interface 132. The wireless communication interface 132 may contain modulation and demodulation circuits to wirelessly communicate via a second communication coil 134 (which may be a coil or a loop antenna). Thus, the receiver controller 128 may wirelessly communicate with the transmission controller 108 via the wireless communication interface 132 and the wireless communication interface 114 using NFC communications or Bluetooth.

In some traditional wireless power systems, a primary coil can transfer wireless energy to a secondary coil up to a rating predetermined by a wireless standard. For example, a low power wireless power signal may convey 5 Watts (5 W), 9 W, 12 W, or 15 W. A low power wireless power system may deliver up to 15 Watts of energy which is suitable for many electronic devices. Higher power wireless systems are being developed to support wireless power transmission to appliances or devices that require more power. For example, a high-power cordless kitchen transmitter may deliver power as high as 2.2 kW.

An interface space 180 may demark a space between the wireless power transmission apparatus and the wireless power reception apparatus. For example, the interface space may include a surface of the wireless power transmission apparatus on which the wireless power reception apparatus may be placed. A distance between the primary coil 110 and the secondary coil may include a thickness of a surface in the interface space. During wireless power transfer, the primary coil 110 may induce a magnetic field (referred to as the primary magnetic field) through the interface space and into an operative environment in which the secondary coil is placed. Thus, the "operative environment" is defined by the primary magnetic field in the system, where the primary magnetic field of a primary coil 110 is detectably present and can detectably interact with the secondary coil or a foreign object 190 (shown as FO 190). A foreign object 190 present in the operative environment of the WPT system may experience an increase in temperature due to interaction with the primary magnetic field. Therefore, when a foreign object is detected, the wireless power transmission apparatus may discontinue generating the primary magnetic field or otherwise prevent the wireless power transmission apparatus from transferring sufficient amounts of energy in the foreign object to cause the foreign object to heat beyond a safe level. Traditional techniques for detecting a foreign object may be based on a power loss accounting in which an amount of power received by the wireless power reception apparatus is compared with an amount of power output by the wireless power transmission apparatus and attribute a loss in power to a foreign object 190. However, such techniques, when used alone, may be too slow, inaccurate, or insufficient in detecting the foreign object, particularly with higher power wireless power transfer systems.

Figure 2:
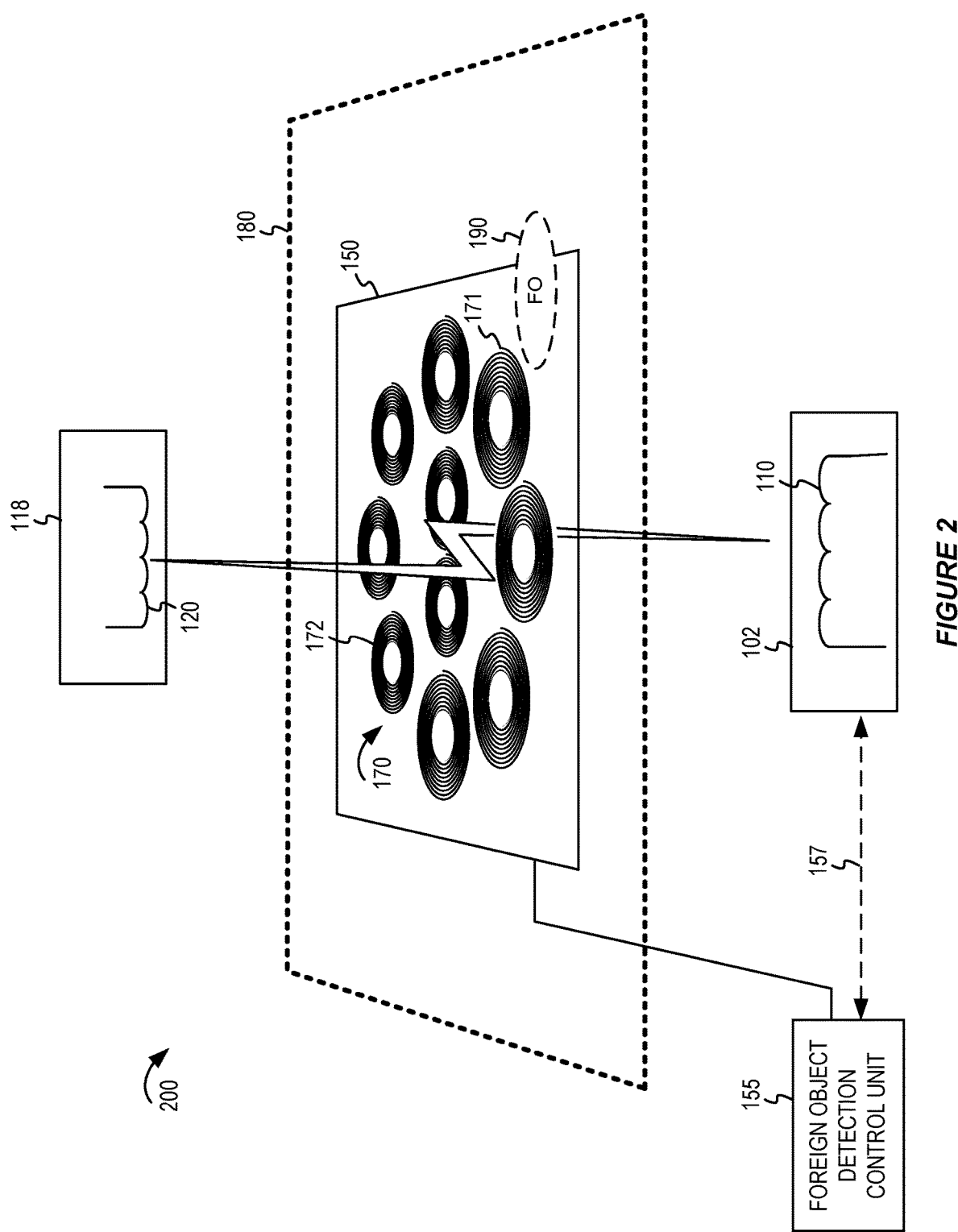
FIG. 2 shows a block diagram of an example detection apparatus in a wireless power transfer system.

FIG. 2 shows a block diagram of an example detection apparatus in a wireless power transfer system 200. The wireless power transfer system 200 includes a wireless power transmission apparatus 102 (with a primary coil 110), an interface space 180, and a wireless power reception apparatus 118 (with a secondary coil 120) as described with reference to FIG. 1. For brevity, other components of the wireless power transmission apparatus 102 and the wireless power reception apparatus 118 are not shown in FIG. 2. A detection apparatus (such as the FOD mat 150 shown in FIG. 2, or variations thereof) may include a plurality of detection coils 170 capable of detecting the presence of a foreign object in accordance with some aspects of this disclosure. The detection coils 170 may be arranged in a pattern to cover an area at least a threshold greater than a relative potential overlapping surface area of the primary coil 110 and the secondary coil 120. In some implementations, the detection apparatus may include an FOD mat 150 and the detection coils may be constructed into or onto the FOD mat 150. Although not shown in FIG. 2, in some implementations, the FOD mat may extend for a full area of the interface space. Alternatively, the FOD mat (and the quantity or configuration of the detection coils therein) may be sized based on a technical specification that defines the sizes of the primary coil 110, the secondary coil, or both. While the example in FIG. 2 shows the detection apparatus deployed as a FOD mat 150 in or on a surface, in some implementations the detection apparatus may be deployed on or in any surface or construction in the space between the transmitter coil 110 and receiver coil 120.

The FOD mat 150 may be associated with a control unit 155. In some implementations, the control unit 155 may communicate (shown as dashed arrow 157) with the wireless power transmission apparatus 102 to enable or disable the wireless power transfer operations of the wireless power transmission apparatus 102 based on whether the control unit 155 detects a foreign object 190 in proximity to the detection coils 170. In some implementations, the control unit 155 may communicate (not shown) with the wireless power reception apparatus 118 to enable or disable the wireless power transfer operations of the wireless power reception apparatus 118 based on whether the control unit 155 detects a foreign object 190 in proximity to the detection coils 170. Although only one FOD mat 150 is shown in FIG. 2, in some implementations, two or more FOD mats may be deployed in a WPT system. For example, the control unit 155 may perform foreign object detection using FOD mats (not shown) located in relation to different primary coils of different wireless power transmission apparatuses in a stove top or other wireless power appliance. Alternatively, or additionally, one FOD mat may be located in association with the wireless power transmission apparatus and another FOD mat may be located in association with the wireless power reception apparatus. Each of the FOD mats may be connected to the same or different foreign object control units (performing the functions described with reference to the control unit 155 of FIG. 2).

The technique by which a control unit 155 communicates with the wireless power transmission apparatus or the wireless power reception apparatus may vary. For example, the control unit 155 may have a wired communication link (not shown) to a transmission controller (not shown) of the wireless power transmission apparatus 102 or a receiver controller (not shown) of the wireless power reception apparatus 118. In some implementations, the control unit 155 may communicate by a wireless communication link (not shown) with the wireless power transmission apparatus 102 or the wireless power reception apparatus 118, or both. In some implementations, the control unit 155 may communicate with the wireless power transmission apparatus 102 or the wireless power reception apparatus 118 using a pin line or other control signal without a need for a communication protocol.

The FOD mat 150 may be a flexible mat, a conformable mat, a rigid mat or a plug and play mat, a standalone mat, or combinations thereof. A substrate of the FOD mat 150 may be made of electrically insulating material. In some implementations, the FOD mat 150 may further include a mechanical wear resistant material to withstand movement of the wireless power reception apparatus over it (such as when the wireless power reception apparatus 118 is large appliance). In some implementations, the FOD mat 150 may further be designed for outdoor application and designed to withstand temperature, humidity and may be resistant to water ingress. The detection coils 170 may be disposed on a substrate of the FOD mat 150 or may be embedded in the substrate of the FOD mat 150 for user safety and aesthetics. In some other embodiments, the detection coils 170 may be printed, molded, woven, or additively manufactured on the substrate of the FOD mat 150.

The detection coils 170 may be operated in pairs. For example, a first detection coil 171 and a second detection coil 172 may form a coil pair. The control unit may excite the first detection coil 171 and the second detection coil 172 using a high frequency (higher than a frequency typically used for the primary magnetic field). When present, the foreign object may cause the first detection coil 171 to experience a different impedance compared to the second detection coil 172 (where no foreign object is present). By comparing the current drawn through the first detection coil 171 and the second detection coil 172, the control unit may determine that the foreign object is present near the first detection coil 171 or the second detection coil 172. The difference in current drawn by a coil pair may be referred to as a differential current. When the control unit determines that the foreign object is present based on the differential current, the control unit may cause the wireless power transmission apparatus to cease wireless power transmission.

Figure 3:
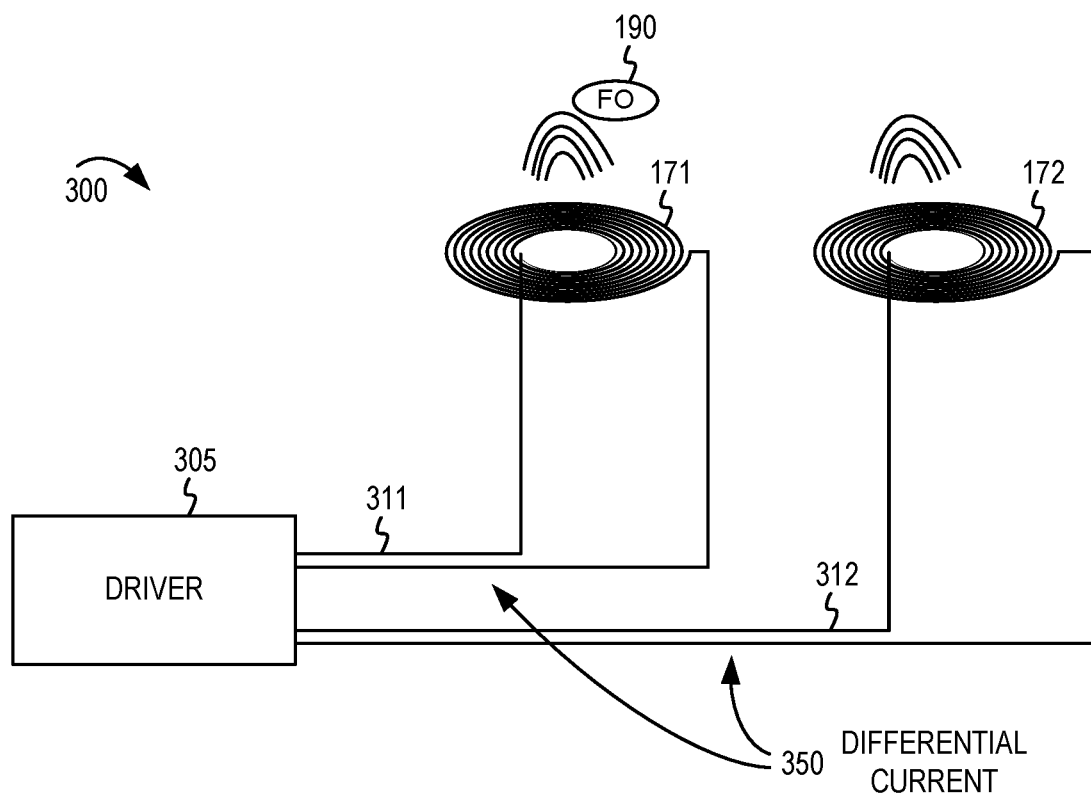
FIG. 3 shows a block diagram of an example detection apparatus configured to excite a pair of detection coils to measure a differential current.

FIG. 3 shows a block diagram 300 of an example FOD mat configured to excite a pair of detection coils to measure a differential current. FIG. 3 shows a coil pair comprising a first detection coil 171 and a second detection coil 172. The coil pair is connected in parallel to a driver 305. Thus, when one of the detection coils in the coil pair is excited, so is the other detection coil. For brevity, the example in FIG. 3 is described as a coil pair having two detection coils. Each detection coil 171 and 172 may be a singular coil or may be constructed from two or more sub coils connected in series (as described further with reference to FIGS. 11 and 12).

A driver 305 may be operatively coupled to the coil pair (the first detection coil 171 and the second detection coil 172 in this example). The driver 305 may be configured to concurrently excite the detection coils 171 and 172 of the coil pair using an alternating current signal through coil connections 311 and 312. In some implementations, the impedance values of the first detection coil 171 and the second detection coil 172 may be the same or similar when a foreign object 190 is not present. However, when the foreign object 190 is present, the foreign object 190 may cause a change in impedance to one of the detection coils 171 and 172 such that the first detection coil 171 has a first impedance value and second detection coil 172 has a second impedance value. The difference in impedance may cause an amount of current drawn through the coil connections 311 and 312 to differ. A differential current 350 may refer to a comparison of the current drawn through the coil connections 311 and 312. When the foreign object 190 is not present and the impedance of the detection coils 171 and 172 are same or similar, the amount of current drawn through the coil connections 311 and 312 may be same or similar. Therefore, the differential current 350 may be a low value indicating little or no difference. Conversely, when the foreign object 190 is present near one of the first detection coil 171, the impedance of that first detection coil 171 will change causing the differential current 350 to indicate a higher difference in the current drawn through the coil connections 311 and 312.

Figure 4:
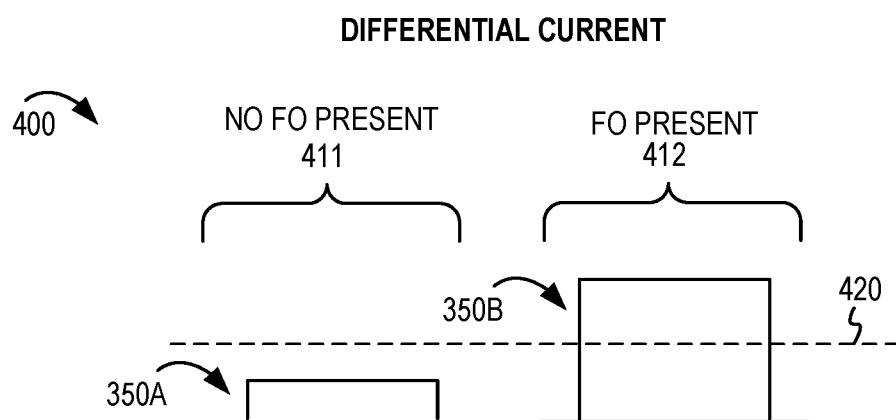
FIG. 4 shows a chart with example magnitudes of differential currents.

FIG. 4 shows a chart 400 with example magnitudes of differential currents. For example, FIG. 4 pictorially illustrates example magnitudes of differential currents 350A and 350B (as examples of the differential current 350 of FIG. 3) and how the differential current may can be used to determine whether a foreign object is present. When no foreign object is present (shown at graph 411), a magnitude of the differential current 350A may be lower than a differential current threshold level 420. When a foreign object is present (shown at graph 412), the magnitude of the differential current 350B may be above the differential current threshold level. The differential current threshold level may be a configurable parameter based on a desired sensitivity of the detection apparatus.

In the example shown in FIG. 4, a foreign object is detected when the differential current is above a differential current threshold. In some implementations, the foreign object is detected based on an amount of change in the differential current. For example, the differential current may be higher during a baseline state and then decrease below a threshold amount when the foreign object is detected. The differential current may become greater or may become lesser (compared to a previous measurement or a baseline measurement) when a foreign object is present. Thus, in some implementations, the amount of change in differential current can indicate the presence of a foreign object. A change in the amount of the differential current may be compared with a delta threshold to determine whether the change is based on the introduction of a foreign object.

Figure 5:
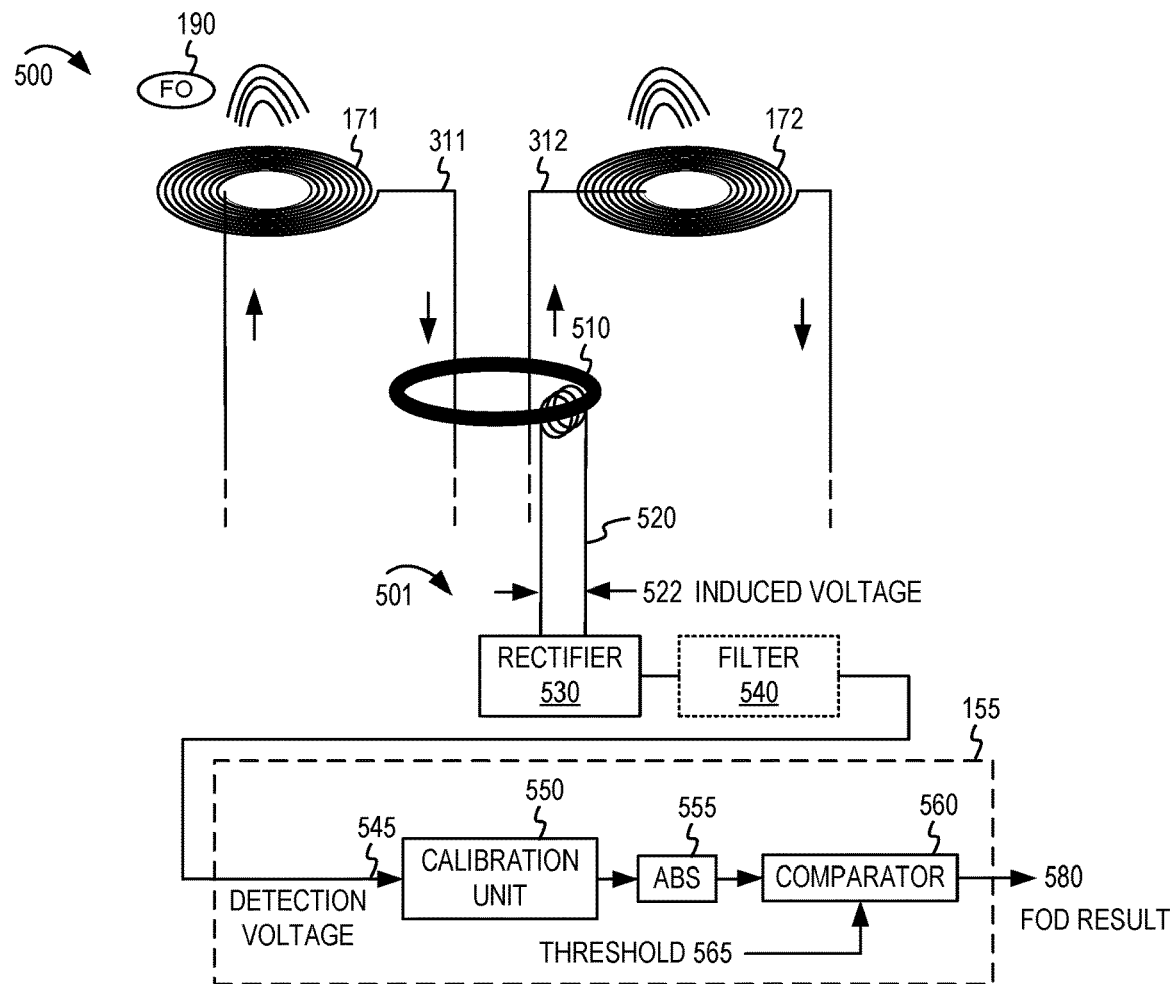
FIG. 5 shows a block diagram of an example detection apparatus based on a detection voltage induced by a differential current.

FIG. 5 shows a block diagram of an example detection apparatus 500 based on a detection voltage induced by a differential current. The example detection apparatus may include detection coils arranged in pairs as described herein. For example, the example detection apparatus may include a pair of detection coils 171 and 172 (referred to as a coil pair) as described with reference to FIG. 3. For brevity, the driver and other components of the WPT system are not shown in FIG. 5. However, the detection apparatus includes a driver (not shown) configured to concurrently excite the coil pair during an FOD period. The presence (or lack thereof) of the foreign object 190 may cause a measurable differential current in the coil connections 311 and 312. FIG. 5 provides one example of a differential current sensing apparatus that can be used to measure the differential current. The differential current sensing apparatus may include a magnetic core 510, a differential current sensing circuit 501 and control unit 155. The control unit 155 may be configured to generate a foreign object detection signal 580 based on the differential current in the coil connections 311 and 312.

When the currents on the coil connections 311 and 312 are passed through a magnetic core 510, the difference in current generates a flux linkage in the magnetic core. The coil connections 311 and 312 are passed through the magnetic core in opposite directions so that an equal current in the coil connections 311 and 312 will generate a smaller flux linkage while differences in the current of the coil connections 311 and 312 generate a greater flux linkage. The flux linkage in the magnetic core 510 may induce a corresponding electrical signal in a sensor coil 520 wound around the magnetic core 510. This induced electrical signal, under conditions of the magnetic core 510 not magnetically saturated, has an induced voltage 522 that is dependent on (such as related to or proportional to) the difference between current in the coil connections 311 and 312 and is representative of a measure of the differential current between the coil pair of detection coils 171 and 172.

The differential current sensing circuit 501 also may include a rectifier 530 that receives and rectifies the induced electrical voltage signal to generate a DC detection voltage 545 (referred to as detection voltage 545). An optional filter 540 may filter the detection voltage before sending the detection voltage to the control unit 155. In one example, the filter 540 is configured to filter out high frequency components from the measurement. In some implementations, the control unit 155 may include a comparator 560 configured to compare an absolute value of the detection voltage with a detection threshold 565. Based on the comparison of the detection voltage with the detection threshold 565, the control unit 155 may communicate a foreign object detection signal 580 or other control signal to a component of the WPT system (such as a wireless power transmission apparatus or a wireless power reception apparatus). For example, when the absolute value of the detection voltage is greater than the detection threshold 565, the control unit 155 may indicate that a foreign object is present. Alternatively, the detection voltage in the presence of foreign object may be lower than the detection voltage when the foreign object is absent. Thus, in some implementations, a change in the absolute value of the detection voltage (from a previous or baseline measurement to the present measurement) may be compared with a delta threshold and a foreign object may be detected when the amount of change is greater than the delta threshold.

The control unit 155 may include a component 555 to generate the absolute value (referred to as the magnitude) of the detection voltage.

In some implementations, the control unit also may include calibration unit 550 configured to add or subtract an offset value (sometimes referred to as an "offset" for brevity) to the detection voltage. For example, the offset value may be based on a normal difference in impedance of the coil pair of detection coils 171 and 172 or may be based on a baseline measurement of the detection apparatus. In some implementations, the offset value may be determined during or after manufacturing of the detection coils 171 and 172. Alternatively, or additionally, the offset value may be determined by the control unit or another test equipment (not shown) during a baseline measurement of the detection apparatus when no foreign object is present. For example, the offset value may account for minor differences in impedance caused by other components of an FOD mat, a wireless power transmission apparatus, or a wireless power reception apparatus, depending on where the detection apparatus is installed. Alternatively, or additionally, the offset value may be based on a determination of the impedance difference as a result of a wireless power reception apparatus in the operating environment of the WPT system determined during a previous measurement.

Figure 6:
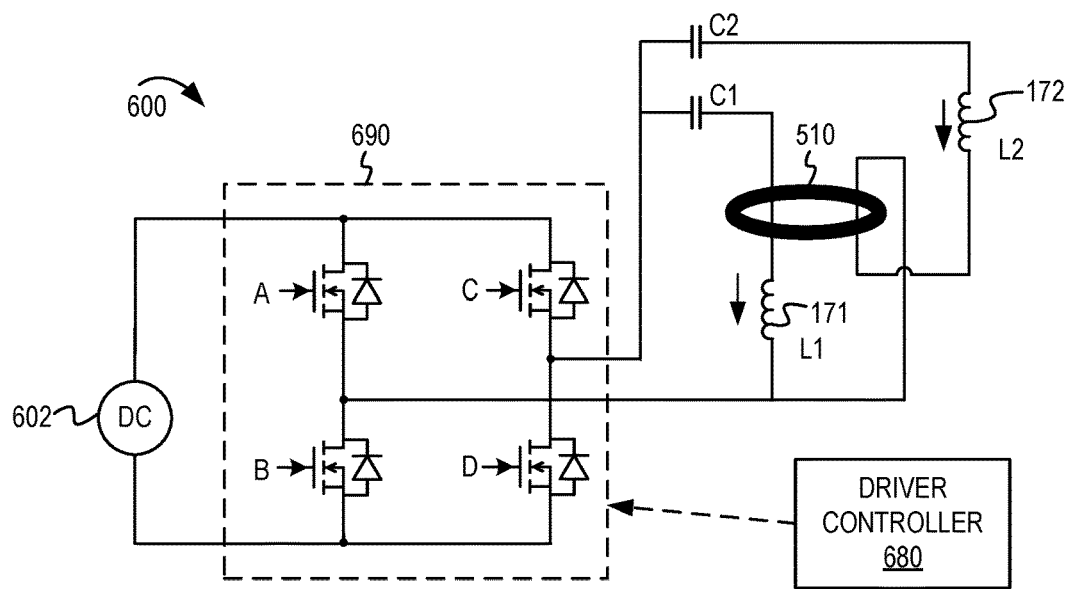
FIG. 6 shows a circuit diagram of an example electrical configuration of a coil pair.

FIG. 6 shows a circuit diagram of an example electrical configuration 600 of a single coil pair. A power source 602 may provide power to a driver 690. The driver 690 may be configured to concurrently excite a first detection coil 171 and a second detection 172 during and FOD period. As shown in FIG. 6, the detection coils 171 and 172 may be connected in parallel to the driver. Each of the detection coils 171 and 172 may have a capacitor C1 or C2. In some implementations, the detection coils 171 and 172 may be referred to as inductors L1 and L2, respectively. A driver controller 680 may be part of a control unit of the detection apparatus or may be implemented as a separate logical component of the detection apparatus. The driver may be a full bridge inverter. During and FOD period, in which the coil pair is excited to measure the differential current, the driver controller may control gates (A, B, C, and D) in the driver to cause the driver to generate an AC electrical signal to the detection coils 171 and 172. In some implementations, the FOD period may occur before wireless power transfer between a wireless power transmission apparatus and a wireless power reception apparatus. Alternatively, or additionally, the FOD period be associated with a measurement gap time period during which an ongoing wireless power transfer is suspended for the purposes of performing a foreign object detection procedure. FIG. 6 illustrates a configuration in which the detection coils 171 and 172 have coil connections passed through a magnetic core 510 of a differential current sensing apparatus. The coil connections may be passed through the magnetic core in opposite directions (as shown in FIG. 6).

Figure 7:
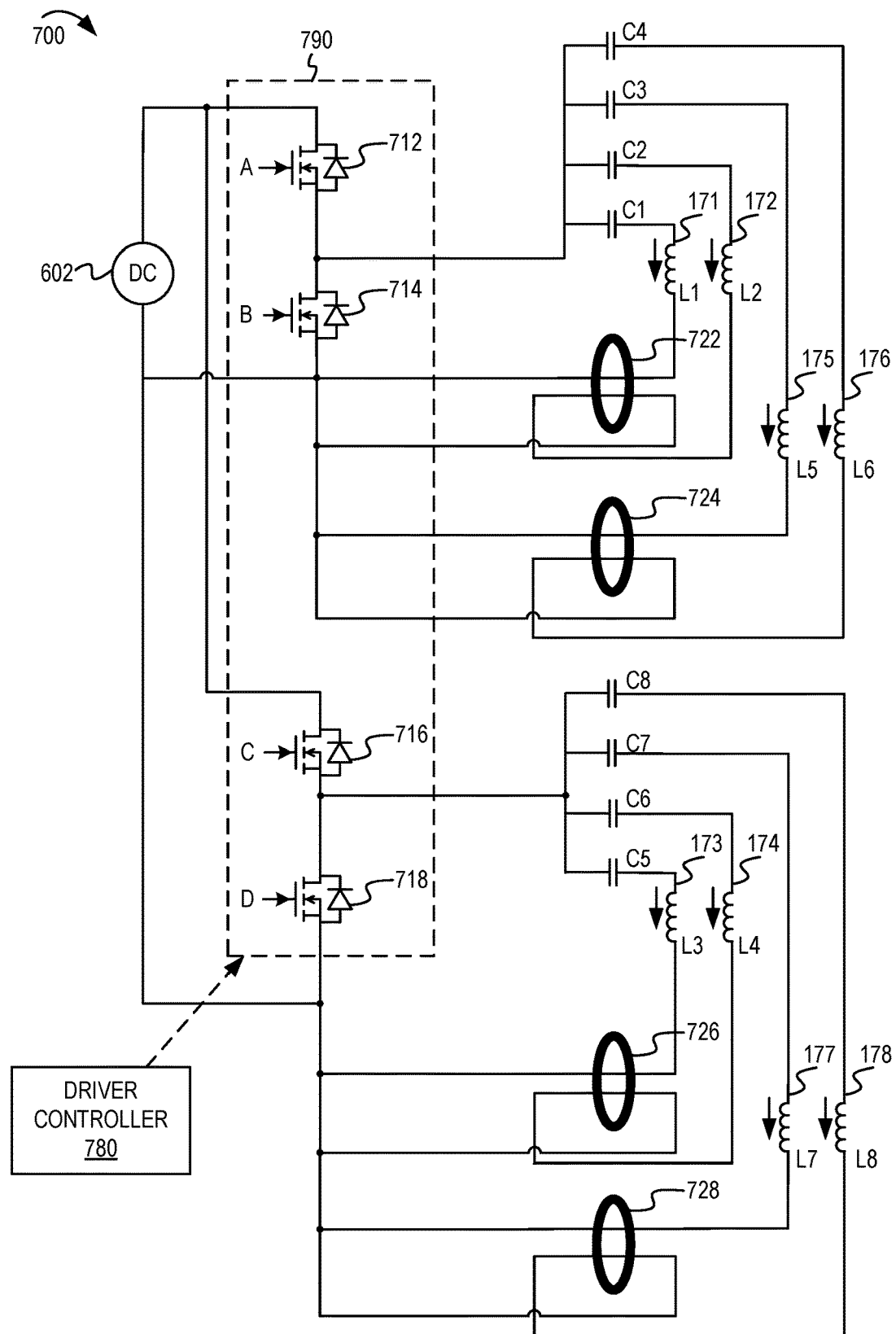
FIG. 7 shows a circuit diagram of an example electrical configuration of multiple coil pairs.

FIG. 7 shows a circuit diagram 700 of an example electrical configuration of multiple coil pairs. As described herein, a detection apparatus may utilize multiple coil pairs associated with corresponding detection zones. In some implementations, a detection apparatus may excite more than one coil pair at the same time, particularly when the coil pairs are associated with non-adjacent detection zones. In the circuit diagram, four coil pairs are shown. A first coil pair comprises first and second detection coils 171 and 172. A second coil pair comprises third and fourth detection coils 173 and 174. A third coil pair comprises fifth and sixth detection coils 175 and 176. A fourth coil pair comprises seventh and eighth detection coils 177 and 178. It should be apparent that the example of FIG. 7 is provided for pedagogical purposes and a detection apparatus may have any variety of coil pairs.

The circuit diagram 700 includes a power source 602 configured to provide power to a driver unit 790. The driver unit 790 may include one or more drivers. As shown in FIG. 7, the driver unit 790 may include two drivers, represented as half-bridge inverters. A first driver includes devices 712 and 714 forming a first half-bridge inverter. A second driver includes devices 716 and 718 forming a second half-bridge inverter. A driver controller 780 may control operation of the devices using control signals A, B, C, and D such that the first driver and the second driver may operate in a coordinated manner to excite the coil pairs at different times.

Each coil pair may pass through a corresponding magnetic core 722, 724, 726 and 728. Although illustrated as separate magnetic cores in FIG. 7, in some implementations, the quantity of magnetic cores may be reduced by having some coil pairs share a same magnetic core provided that only one coil pair per magnetic core is not excited during the FOD period. During a first FOD period, the driver controller 780 may cause a first coil pair (the detection coils 171 and 172) to be excited and also may cause a third coil pair (the detection coils 175 and 176) to be excited. The differential current sensing circuit (not shown) associated with each of the magnetic cores 722 and 724 may measure the detection voltage associated with the first coil pair and the third coil pair during the first FOD period. During a second FOD period, the driver controller 780 may cause a second coil pair (the detection coils 173 and 174) to be excited and also may cause a fourth coil pair (the detection coils 177 and 178) to be excited. The differential current sensing circuit (not shown) associated with each of the magnetic cores 726 and 728 may measure the detection voltage associated with the second coil pair and the fourth coil pair during the second FOD period. Thus, the circuit diagram enables a driver controller 780 to manage excitation of multiple coil pairs by the driver unit 790 in accordance with a pattern.

Figure 8A:
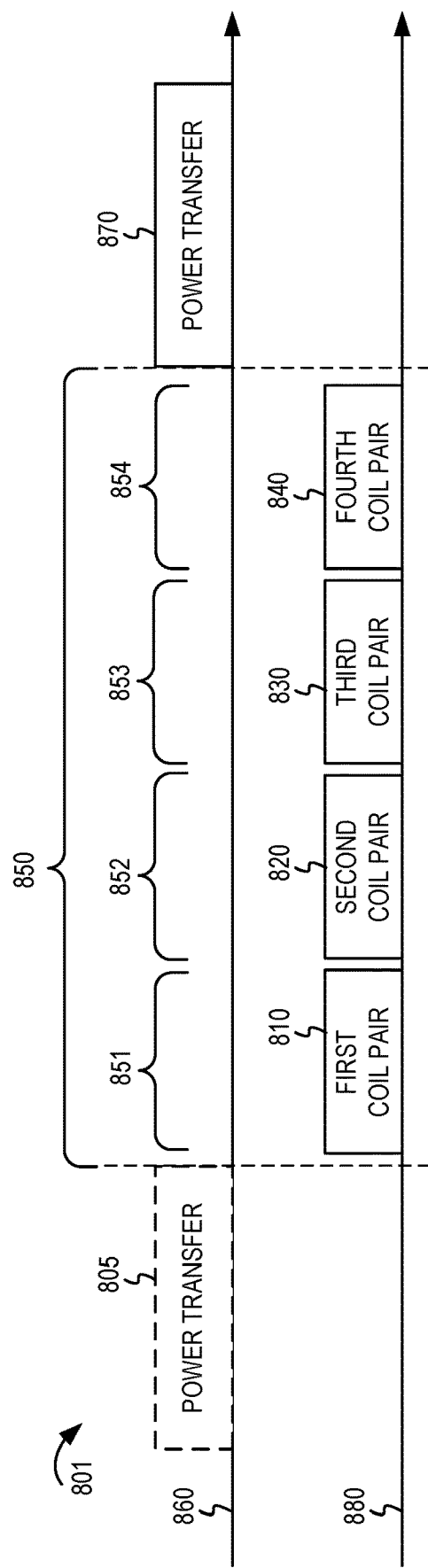
FIG. 8A shows an example timing diagram for a detection apparatus having multiple coil pairs.

FIG. 8A shows an example timing diagram 801 for a detection apparatus having multiple coil pairs. The timing diagram 801 shows the timing 860 of wireless power transfer in a WPT system and the timing 880 of a foreign object procedure of a detection apparatus. In some implementations, the foreign object procedure may be performed before a wireless power transfer 870. Alternatively, or additionally, the foreign object procedure may be performed during a measurement gap 850 during which a wireless power transfer 805 is suspended to enable the foreign object detection procedure to occur with less interference caused by the primary magnetic field of the wireless power transfer. FIG. 8A shows a sequential pattern in which a different coil pair 810, 820, 830, and 840 is excited in each FOD period 851, 852, 853, and 854. For example, a first coil pair 810 may be excited and its differential current may be measured during a first FOD period 851. Thereafter, the detection apparatus may discontinue exciting the first coil pair 810 and may excite a second coil pair 820 during a second FOD period 852 so that the differential current of the second coil pair 820 may be measured. The third coil pair 830 may be excited during a third FOD period 853, and a fourth coil pair 840 may be excited during a fourth FOD period 854. In this manner, each coil pair may be excited during a different FOD period so that its related differential current may be measured absent from interference of the other coil pairs.

Figure 9A:
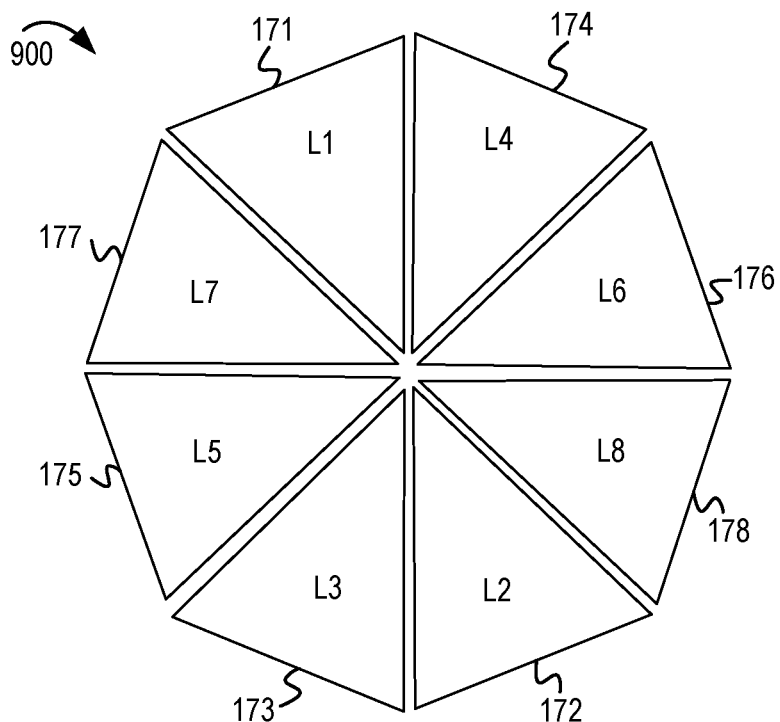
FIG. 9A shows a diagram of multiple coil pairs in associated detection zones.
Figure 9B:
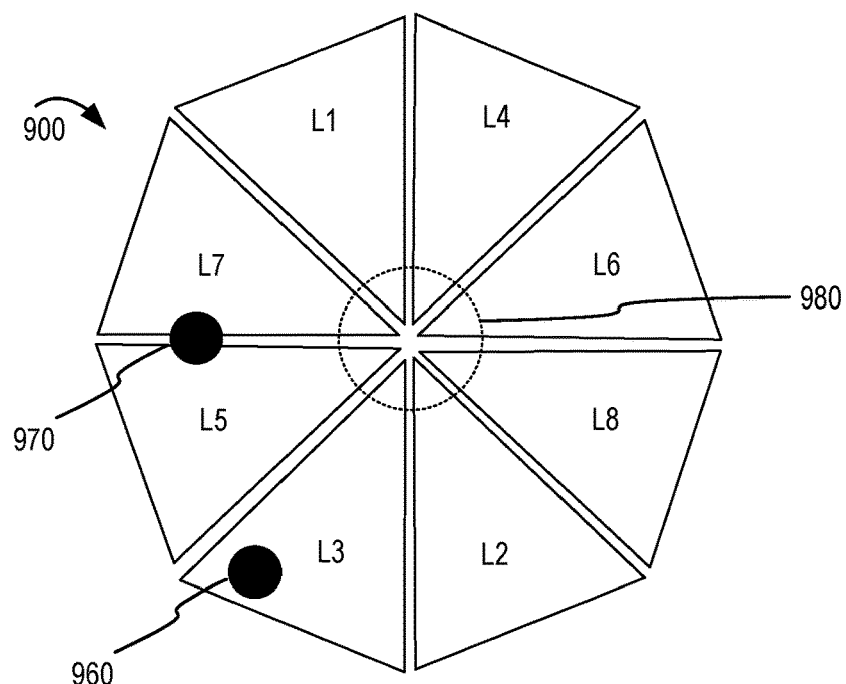
FIG. 9B shows example detection of a foreign object using the multiple coil pairs of FIG. 9A.
Figure 10:
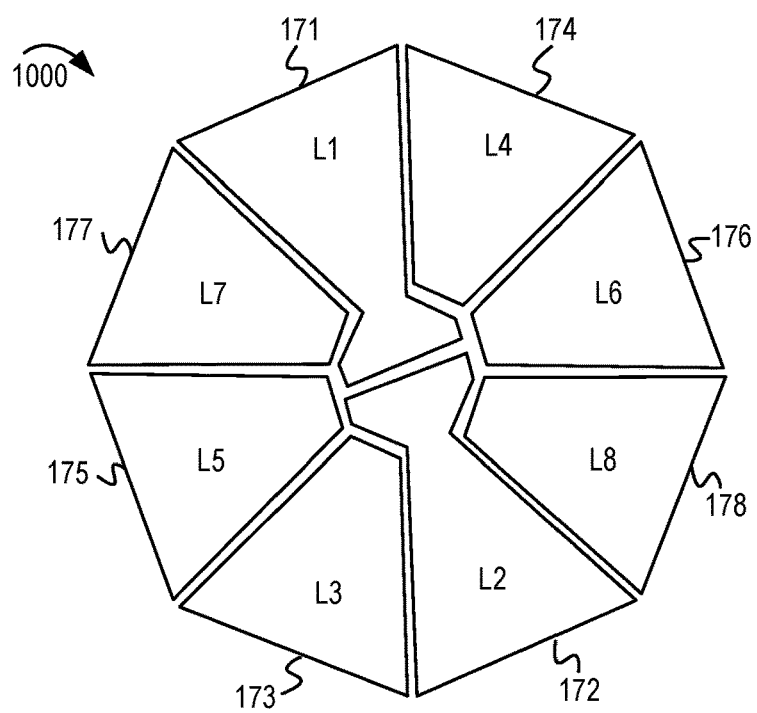
FIG. 10 shows another diagram of multiple coil pairs in associated detection zones.

FIG. 8B shows another example timing diagram 802 for a detection apparatus having multiple coil pairs. As with FIG. 8A, the timing diagram 802 shows the timing 860 of wireless power transfer in a WPT system. Different from FIG. 8A, the detection apparatus may excite multiple coil pairs during each FOD period. For example, during the first FOD period 851, the detection apparatus may excite the first coil pair 810 and the third coil pair 830 and measure their respective differential currents. During the second FOD period 852, the detection apparatus may excite the second coil pair 820 and the fourth coil pair 840 and measure their respective differential currents. Thus, the measurement gap 850 may be shortened and the foreign object detection may be performed more quickly. In some implementations, the detection apparatus may use the circuit diagram described with reference to FIG. 7 to excite the various coil pairs. One consideration regarding which coil pair to excite during a same FOD period is the proximity or adjacency of the detection coils for the coil pairs. The examples in FIG. 8B are based on a design in which the first coil pair 810 and the third coil pair 830 are in non-adjacent detection zones (and the second coil pair 820 and the fourth coil pair 840 are in non-adjacent detection zones). FIGS. 9A, 9B and 10 provide some example layouts using the non-adjacent coil pairs in the pattern described with reference to FIG. 8B.

FIG. 8C shows another example timing diagram 803 for a detection apparatus having multiple coil pairs. As with FIG. 8B, the timing diagram 803 in FIG. 8C shows the timing 860 of wireless power transfer in a WPT system. The coil arrangement used for FIG. 8C may be similar to those described with reference to FIG. 8B. FIG. 8C shows an implementation in which the FOD periods may be interspersed during periods of wireless power transfer. For example, during a first FOD period 853, the detection apparatus may excite the first coil pair 810 and the third coil pair 830 and measure their respective differential currents. Following the first FOD period 853, the WPT system may have a period of wireless power transfer 871 before the next FOD period (shown as second FOD period 854). During the second FOD period 854, the detection apparatus may excite the second coil pair 820 and the fourth coil pair 840 and measure their respective differential currents. Another period of wireless power transfer 872 may follow the second FOD period 854. The FOD periods 853 and 854 may be interspersed between periods of wireless power transfer 871 and 872.

FIG. 9A shows a diagram 900 of multiple coil pairs in associated detection zones. The coil pairs may be associated with detection zones. In some implementations, a detection mat may include several detection zones. The detection zones may be similar to geometric shapes such that the detection coils can cover a circle or polygon shaped scan area. The detection zones may define discrete regions of the detection mat. The detection zones may not be physically separated or isolated from one another. However, the detection zones may be electrically isolated from one another and further isolated based on the FOD periods in which they are used. Although geometric shapes are described in this disclosure for brevity, other shapes may be used in some implementations. The example in FIG. 9A illustrates triangular shaped detection coils 171, 172, 173, 174, 175, 176, 177 and 178. For brevity, the detection coils 171, 172, 173, 174, 175, 176, 177 and 178 are referred to as L1, L2, L3, L4, L5, L6, L7 and L8, respectively. The detection coils may be triangular shaped and arranged in detection zones that form a polygon (such as an octagon in the example of FIG. 9A). In some implementations, the detection coils may have a sector shape such that they form a circle shaped FOD scan area. In some implementations, the coils may have other shapes of coils. The coils may be of uniform shape, size, construction material, and the like, resulting in a cost-effective design.

FIG. 9A also shows the coil pairs 901 that are formed in this arrangement. A first coil pair 810 may include coils L1 and L2. As illustrated in FIG. 9A, the coils L1 and L2 may be located in detection zones that are symmetrically arranged with respect to a primary magnetic field (not shown) of the WPT system. A second coil pair 820 may include coils L3 and L4. A third coil pair 830 may include coils L5 and L6. A fourth coil pair 840 may include coils L7 and L8. The first coil pair 810 may be referred to as adjacent to the second coil pair 820 and the fourth coil pair 840 because at least one detection coil (the first detection coil 171) is adjacent to a detection coil (such as the fourth detection coil 174 and the seventh detection coil 177) of those coil pairs. Conversely, the first coil pair 810 and the third coil pair 830 may be non-adjacent coil pairs because the coils L1, L2, L5 and L6 of those coil pairs are non-adjacent. Thus, similar to the pattern described with reference to FIG. 8, the first coil pair 810 and the third coil pair 830 may be utilized during the same first FOD period. And the second coil pair 820 and the fourth coil pair 840 are non-adjacent coil pairs that may be utilized during the same second FOD period.

FIG. 9B shows example detection of a foreign object using the example multiple coil pairs of FIG. 9A. In one example, a foreign object 960 may be located in proximity to the coil L3. When the coil pair of coils L3 and L4 are excited, those detection coils will draw different currents and the differential current may be indicative that the foreign object is located near one of those coils. In another example, a foreign object 970 may be located at the adjacent edges of coils L5 and L7. However, because the coil pairs that include those adjacent coils are excited during different FOD periods, the foreign object may still be detected. When the coil pair of coils L5 and L6 is excited, the foreign object will cause a differential current in that coil pair. When the coil pair of coils L7 and L8 are excited (in a different FOD period), the foreign object will cause a differential current in that coil pair.

At the center area 980 of the FOD scan area, there may be multiple detection coils in close proximity. Thus, when exciting multiple coil pairs there is a possibility of magnetic flux from one coil pair affecting that from another coil pair excited at the same time, resulting in a false determination of FO presence. Furthermore, the detection coils themselves may absorb energy from the primary magnetic field of the WPT system. The concentration of detection coils near the center 980 may result in heating caused by the primary magnetic field or interference with the wireless power transfer. Thus, in some implementations, the detection coils may be designed to reduce the concentration of coil material in the center area 980.

FIG. 10 shows another diagram 1000 of multiple coil pairs in associated detection zones. The layout diagram includes the detection coils 171, 172, 173, 174, 175, 176, 177 and 178 (referred to as L1, L2, L3, L4, L5, L6, L7 and L7, respectively) as described herein. Different from FIGS. 9A and 9B, the first and second detection coils 171 and 172 may have a different shape to address the concentration of coils in the center area 980 described with reference to FIG. 9B. For example, the first coil pair (coils L1 and L2) may be constructed to cover a triangular or a sector shaped portion of an FOD scan area and a center area of the FOD scan area. The other coils (L3, L4, L5, L6, L7, and L8) may cover trapezoidal or annulus sector shaped detection zones within the FOD scan area. It should be understood that the shapes of the detection coils in FIG. 10 are provided as an example. Other shapes may be possible. For example, more than one coil pair may have a unique design to cover the center area. In some implementations the center area may be covered by a coil pair in which the detection coils are the same shape. Alternatively, only one detection coil of the coil pair may cover the center area and the difference in impedance caused by the additional section of that detection coil may be accounted for by the control unit of the detection apparatus using an offset value.

Figure 11:
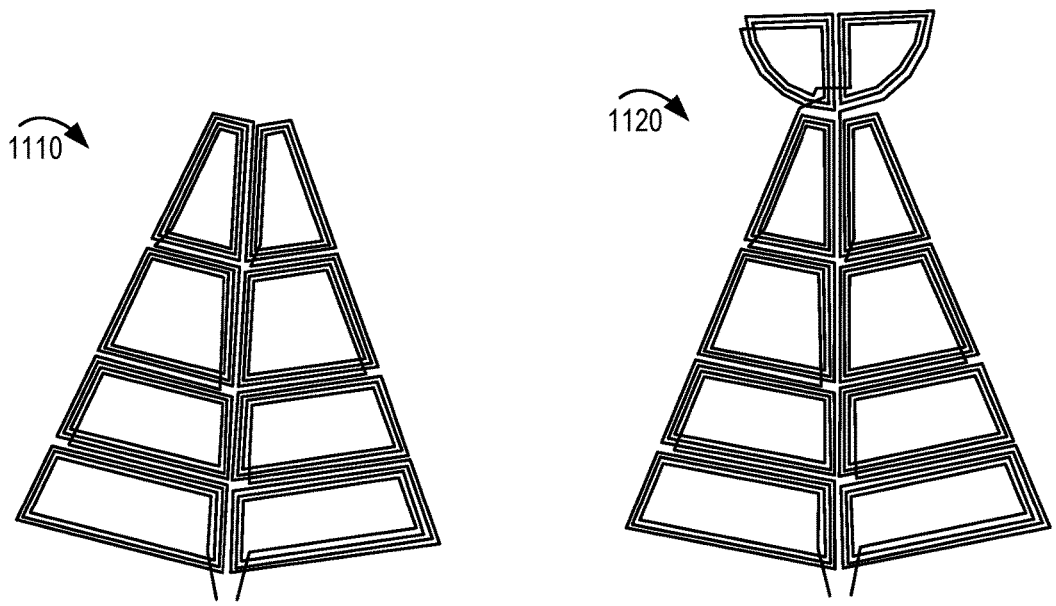
FIG. 11 shows an example line diagram of detection coils.

FIG. 11 shows an example line diagrams of detection coils. A first line diagram 1110 illustrates an example detection coil constructed from multiple sub coils connected in series. The sub coils together form a single detection coil. The first line diagram may be an example of the detection coils L3, L4, L5, L6, L7, and L8 described with reference to FIG. 10. The first line diagram shows eight (8) sub coils that are combined to form the detection coil. The use of sub coils enables the detection coil to be larger, reducing cost and complexity of the detection apparatus while still using smaller size sub coils for impedance response of a smaller foreign object. A second line diagram 1120 illustrates an example detection coil constructed from multiple sub coils connected in serial. The second line diagram may be an example of the detection coils L1 and L2 described with reference to FIG. 10. The second line diagram shows ten (10) sub coils that are combined to form the detection coil. The second line diagram includes the same eight sub coils as the first line diagram and also includes two sub coils to cover a part of the center area of the FOD scan area.

Figure 12:
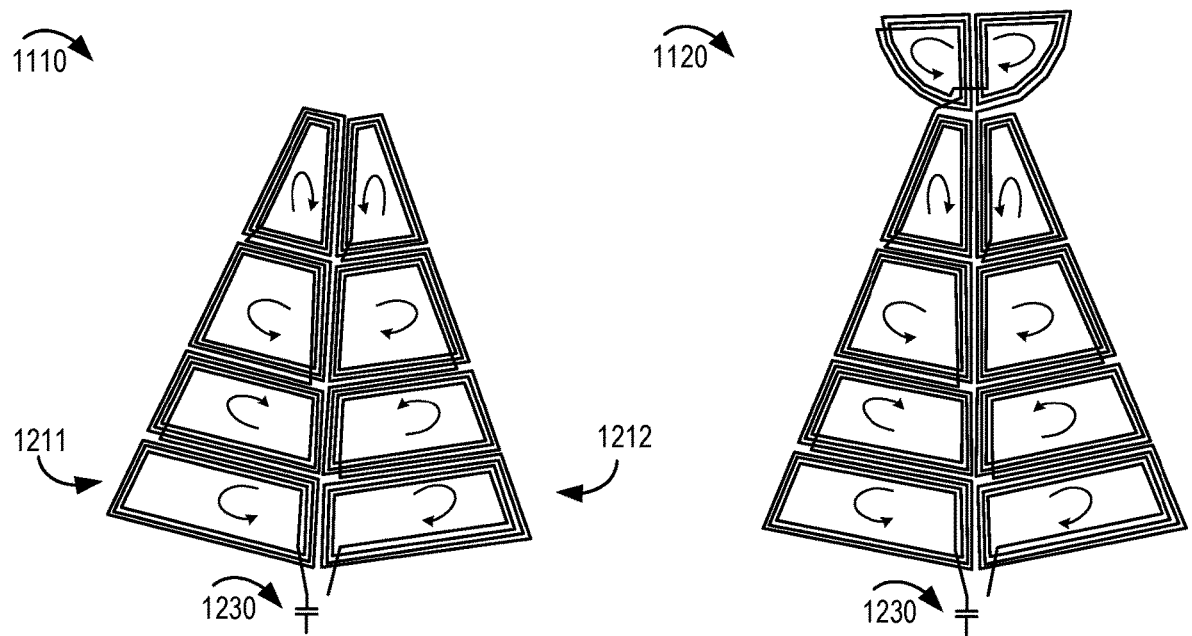
FIG. 12 shows an example line diagrams of detection coils with features to reduce the effect of a power transfer coil field.

FIG. 12 shows an example line diagram of detection coils with features to reduce the effect of a power transfer coil field. The first line diagram and the second line diagram are the same as described with reference to FIG. 11. FIG. 12 shows that the adjacent sub coils within each detection coil may be wound in opposite directions to reduce the effect of the primary magnetic field of the WPT system. For example, a first sub coil 1211 may be wound in a first direction (such as counterclockwise) and its adjacent sub coil 1212 may be wound in a second direction (such as clockwise). The layout of the sub coils may increase the likelihood that any voltages induced in the sub coils (from the primary magnetic field of the WPT system) nearly cancel out and the overall voltage across the detection coil terminals is small. This may protect some electronics in the detection apparatus, reducing power loss, or minimize heating of the sub coils, among other benefits. FIG. 12 also illustrates how adjacent sub coils can be wound in opposite directions in the second line diagram.

Additionally, or alternatively, the detection coils illustrated in FIG. 12 may include capacitors 1230 in one or both terminals of the detection coils. The capacitors 1230 may be examples of the capacitors C1, C2, C3, C4, C5, C6, C7, and C8 shown in FIGS. 6 and 7, respectively. Some WPT systems are capable of transmitting wireless power using a frequency up to a maximum power frequency of 50 kHz. In accordance with some implementations of this disclosure, the detection coils may be excited using a higher frequency (such as 200 kHz or greater). The capacitors 1230 may reduce the effect of circulating currents due to the primary magnetic field (at or below 50 kHz) through the detection coil. The series capacitance of the capacitors 1230 may introduce a high impedance to the 50 kHz wireless power signal while still enabling the high frequency operation of the detection apparatus.

Figure 13:
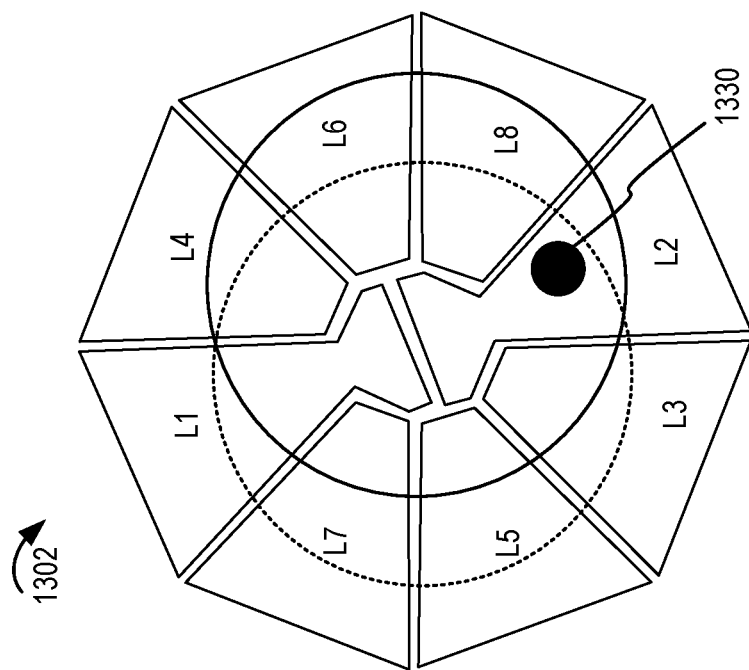
FIG. 13 shows a diagram of multiple coil pairs capable of distinguishing between movement of a wireless power reception apparatus or a foreign object.
Figure 13:
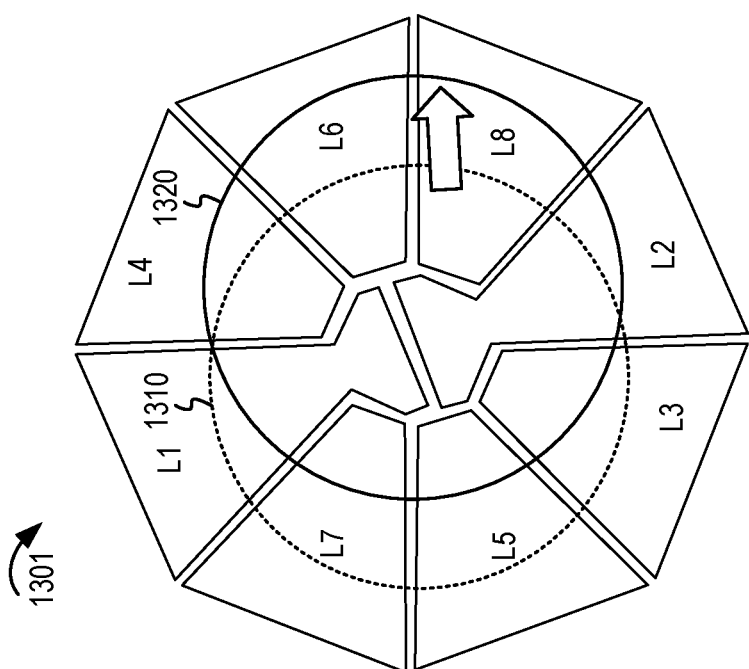

FIG. 13 shows a diagram of multiple coil pairs capable of distinguishing between movement of a wireless power reception apparatus or a foreign object. The layout of FIG. 13 utilizes the example configuration of multiple coil pairs described with reference to FIG. 10. A primary coil (not shown) may be positioned centered and underneath the detection zones covered by coils L1-L8. A first example 1301 illustrates a secondary coil (shown by a single circle, for brevity) that moves from a first position 1310 to a second position 1320 over the array of detection coils. Because the secondary coil includes metallic and ferrite components, the secondary coil may cause a change in impedance of the detection coils. Thus, when the differential currents of the coil pairs are measured, the secondary coil itself may cause a differential current in various coil pairs. However, because the secondary coil is relatively large compared to the size of the detection coils, multiple coil pairs will measure the change in differential current. By comparison, a second example 1302 illustrates a foreign object 1330 introduced in the operating environment of the WPT system. The foreign object is relatively small compared to the size of the detection coils. Thus, perhaps only one or two coil pairs may measure a change in differential current as a result of the introduction of the foreign object. In some implementations, the size of the detection coils L1-L8 (and their sub coils) may be selected based on a standardized size (or sizes) of a secondary coil that conforms to a technical specification. Similarly, the size of the detection coils L1-L8 may be selected based on a potential size of foreign objects that are likely to be introduced into the operating environment. For example, a detection apparatus for use in a kitchen WPT system may size the detection coils appropriately to detect a spoon, fork, coin, key, tin can, or metal plate, among other examples. A detection apparatus for use in an EV WPT system may be sized appropriately to detect a wrench, aluminum can, gas tank, washer, nut, or screw, among other examples. A detection apparatus for use in a desktop WPT system may be sized appropriately to detect foreign objects (such as a pen, keys, computer component, ring, or thumb drive, among other examples).

Figure 14:
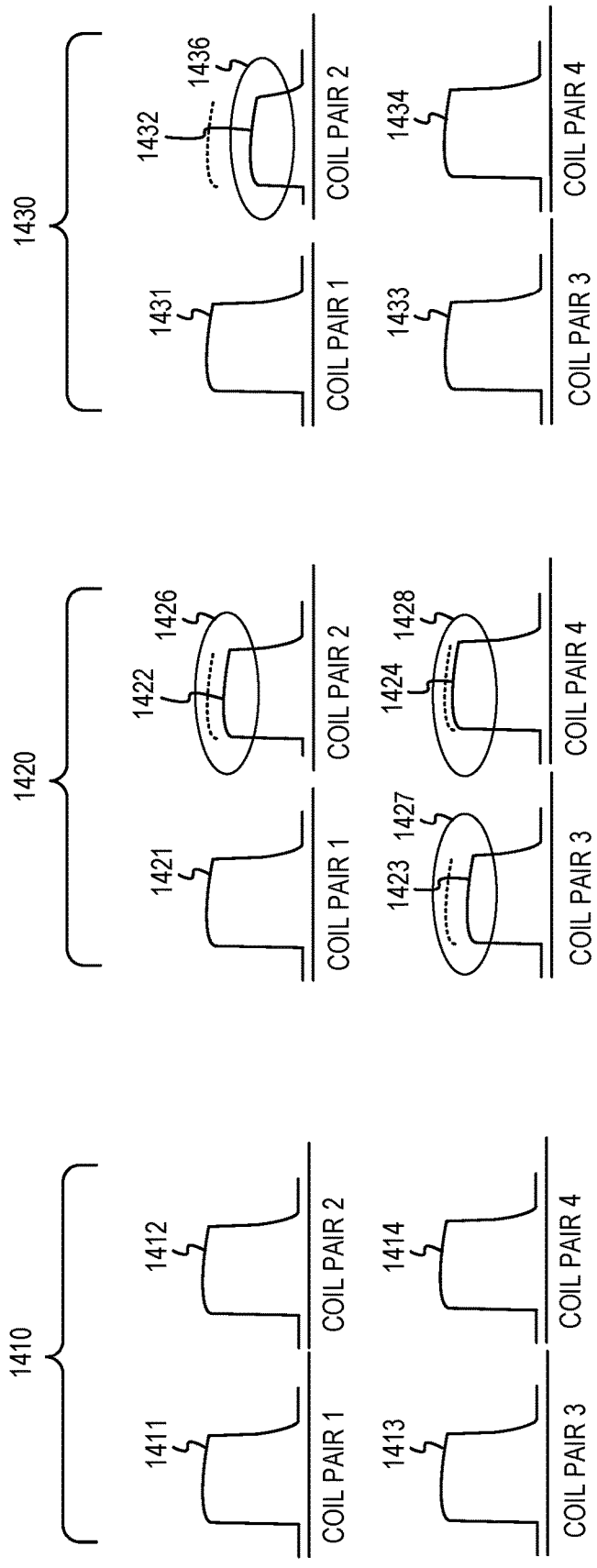
FIG. 14 shows example charts comparing detection voltages induced by differential currents of coil pairs as a result of movement of a wireless power reception apparatus or a foreign object.

FIG. 14 shows example charts 1400 comparing detection voltages induced by differential currents of coil pairs as a result of movement of a wireless power reception apparatus or a foreign object. In a first example 1410, a detection apparatus may establish a baseline calibration of the detection voltages. For example, the detection apparatus may add offset values to the detection voltages for each coil pair based on a test calibration or baseline offset values. The detection voltages 1411, 1412, 1413 and 1414 show the detection voltages induced by the differential currents of multiple coil pairs (such as the coil pairs 810, 820, 830, and 840, described herein). The detection apparatus may determine that no foreign object is present based on the detection voltages. For example, the detection apparatus may compare each detection voltage with a detection threshold and determine, for each coil pair, that no foreign object is present. Alternatively, or additionally, the detection apparatus may compare an amount of change for each detection voltage with a delta threshold and determine that no foreign object is present when the amount of change is below the delta threshold. Based on a determination that no foreign object is present, the WPT system may begin wireless power transfer. The detection apparatus may determine a set of calibration values (which also may be referred to as offset values) based on the presence of the wireless power reception apparatus in the WPT system. The set of calibration values may be used to adjust the detection voltages for the coil pairs during a subsequent foreign object detection procedure.

In a second example 1420 (such as a subsequent measurement), the wireless power reception apparatus may have moved from a previous location associated with a previous measurement. That movement may cause a change in the detection voltages for the coil pairs. For example, the detection voltages 1421, 1422, 1423 and 1424 show the detection voltages induced by the differential currents of the multiple coil pairs. In the second example, the detection voltages 1422, 1423 and 1424 corresponding to the second, third, and fourth coil pair have changed. The changes in the detection voltages 1422, 1423, and 1424 are circled at 1426, 1427, and 1428, respectively, for the benefit of this description. Although illustrated as a decrease in detection voltages (circled at 1426, 1427, and 1428) for pedagogical purposes, in some implementations the change may be an increase in detection voltages. Regardless of whether the change is an increase or a decrease, the detection apparatus may determine how many coil pairs have had a change in detection voltage that is more than a delta threshold. The detection apparatus may determine that the changes are a result of a movement of the wireless power reception apparatus because more than a threshold quantity of coil pairs have had a change in their respective detection voltages. The threshold quantity may be a configurable parameter or may be predetermined. In some implementations, a change in three or more coil pairs may be deemed to be a result of a movement of the wireless power reception apparatus during wireless power transfer. Once the detection apparatus has determined that a change in the detection voltages is a result of a movement of the wireless power reception apparatus, the detection apparatus may adjust the set of offset values for the detection voltages to account for a new position of the wireless power reception apparatus. In some implementations, the offset values may be continuously adjusted during a wireless power transfer when the detection apparatus detects a movement of the wireless power reception apparatus. Once a wireless power transfer is completed or otherwise interrupted, the detection apparatus may reset the offset values back to a baseline calibration.

In a third example 1430, a foreign object may be introduced into the operating environment during wireless power transfer. As described with reference to FIG. 9, the foreign object may impact the differential current of only one or two coil pairs. The detection voltages 1431, 1432, 1433 and 1434 show the detection voltages induced by the differential currents of the multiple coil pairs. In the third example, the detection voltage 1432 of the second coil pair has changed. The change in the detection voltage 1432 is circled at 1436 for the benefit of this description. Because the quantity of coil pairs having a change in detection voltage is less than a threshold quantity, the detection apparatus may determine that the change is a result of a foreign object introduced in proximity to the detection coils of the second coil pair. The detection apparatus may send a foreign object detection signal or control signal to the WPT system to stop the wireless power transfer to prevent the foreign object from becoming overheated.

Figure 15:
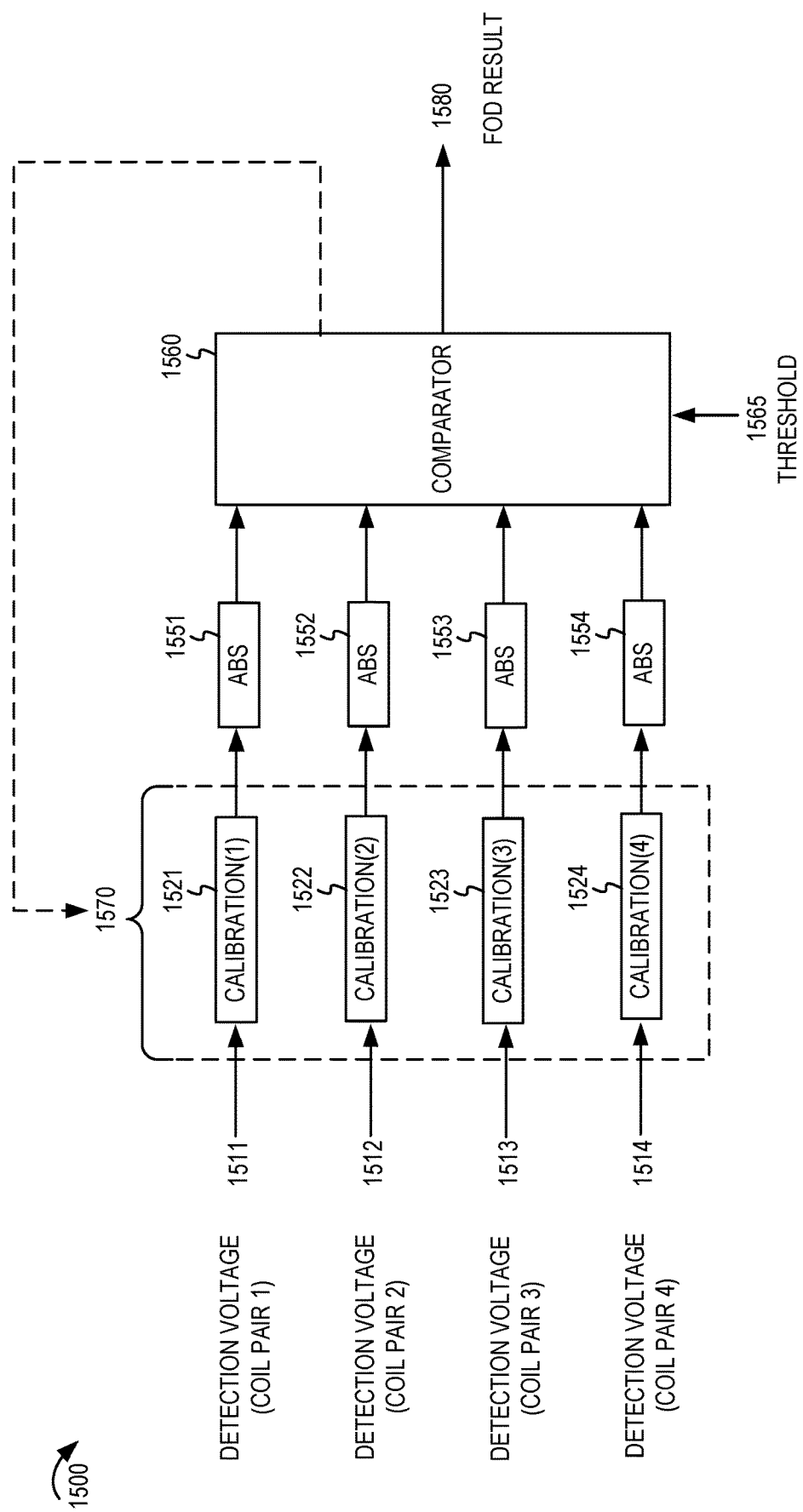
FIG. 15 shows a block diagram of an example detection apparatus configured to adapt detection voltages of coil pairs based on movement of a wireless power reception apparatus.

FIG. 15 shows a block diagram 1500 of an example detection apparatus configured to adapt detection voltages of coil pairs based on movement of a wireless power reception apparatus. The block diagram 1500 may describe features of a control unit in a detection apparatus with multiple coil pairs. The control unit may be configured to receive detection voltages 1511, 1512, 1513, and 1514 from first, second, third, and fourth coil pairs, respectively. Each of the detection voltages may be obtained using different differential current sensing circuits associated with the coil pairs. The detection voltages 1511, 1512, 1513, and 1514 may be adjusted using a set of offset values 1521, 1522, 1523, and 1524, respectively. Initially, the set of offset values (referred to, collectively, as offset values 1570) may be based on a baseline calibration of the detection apparatus. The absolute values (magnitudes) of the detection voltages 1511, 1512, 1513, and 1514 may be determined by components 1551, 1552, 1553, and 1554, respectively. A comparator 1560 may compare each adjusted detection voltage with a detection threshold 1565 to determine whether a foreign object is located near a detection coil of a particular coil pair. In some implementations, if any one of the detection voltages is above the detection threshold, the comparator may send a FOD signal 1580 indicating that a foreign object is detected. Alternatively, or additionally, the comparator may determine a quantity of the detection voltages that have changed from a previous iteration of the foreign object detection procedure. For example, the comparator may determine a change count indicating how many of the detection voltages have changed. If the change count is above a change threshold, the comparator may determine that the changes are a result of a movement of the wireless power reception apparatus and may adjust the offset values 1570 for a subsequent iteration of the foreign object detection procedure. Alternatively, if the change count is below a change threshold an FOD signal 1580 may be based solely on a comparison of each of the detection voltages to the detection threshold.

Figure 16:
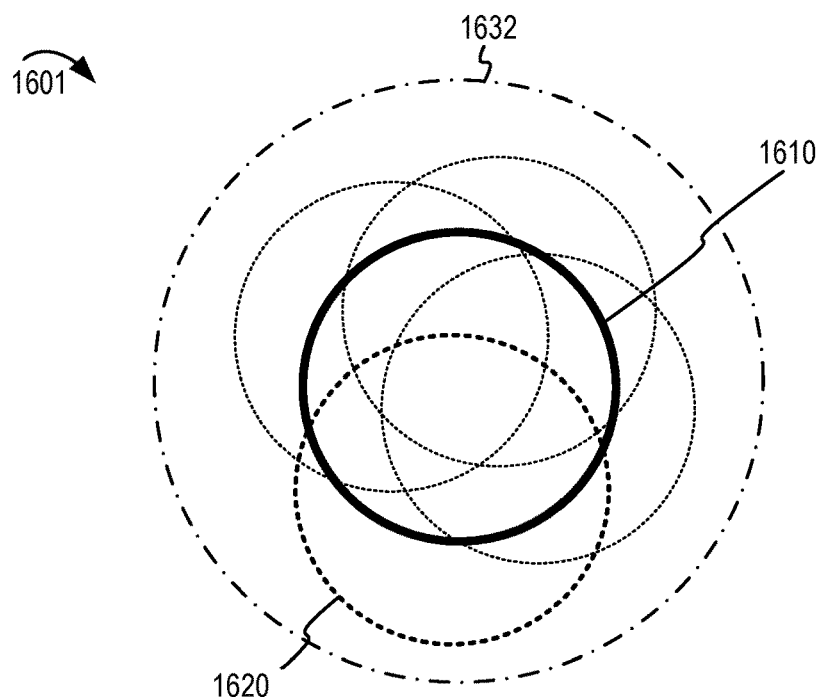
FIG. 16 shows a pictorial diagram of example foreign object detection scan areas.
Figure 16:
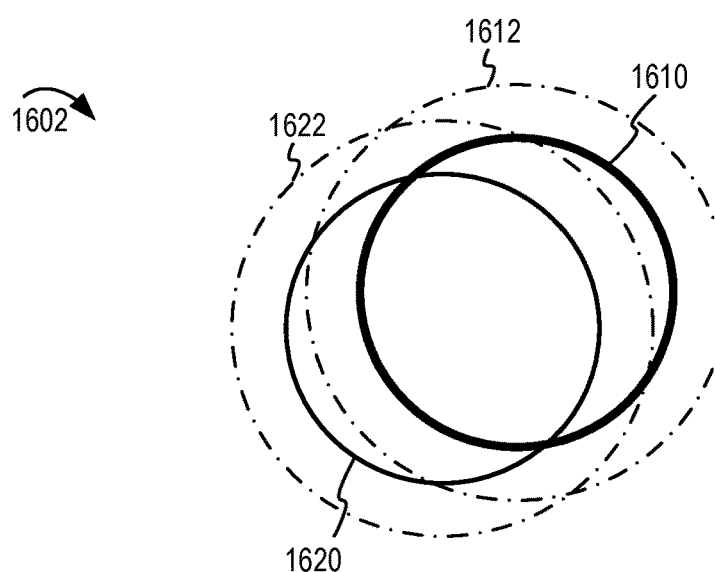

FIG. 16 shows a pictorial diagram of example foreign object detection scan areas. In a first example 1601, an FOD scan area 1632 may be based on a combined overlapping surface area of a primary coil 1610 and a secondary coil 1620. In some implementations, the FOD scan area may be larger than the combined overlapping surface area including any potential misalignment tolerance. For example, the first example shows several potential placements of the secondary coil within the misalignment tolerance. The FOD scan area may be at least a threshold size larger than the potential area of the primary coil 1610 and the secondary coil 1620 taking into account a maximum permitted misalignment of the primary coil and the secondary coil. In some implementations, the FOD scan area may be a circular area with a diameter at least 10% larger than the potential area of the primary coil and a maximally misaligned secondary coil. As an example, if a diameter of the primary coil is 210 millimeters (mm), a diameter of the secondary coil is 235 mm, and the permitted misalignment tolerance is 50 mm, the FOD scan area 1632 may be 358.5 mm (2*((235/2)+(0.1* (235/2))+(50))). The value of 358.5 mm for the FOD scan area 1632 may be based on the largest one of the primary coil and the secondary coil. In this example, the secondary coil is larger (235 mm). The formula includes multiplying a sum of the radius of the secondary coil (235/2) plus 10% of the radius of the secondary coil (0.2*235) plus the misalignment tolerance (50) by a value of 2 to determine a diameter of the FOD scan area 1632. It should be understood that the example calculation is provided for pedagogical purposes and other calculations or formulas may be conducted to determine a size of the FOD scan area based on the size of the various power transfer coils.

In a second example 1602, the detection apparatus may utilize two FOD scan area—a first FOD scan area 1612 related to the primary coil and a second FOD scan area 1622 related to the secondary coil. The FOD scan areas 1612 and 1622 may be at least a threshold size larger than their respective power transfer coils (the primary coil and the secondary coil, respectively). For example, the first FOD scan area may have a diameter at least 10% larger than the diameter of the primary coil. The second FOD scan area 1622 may have a diameter at least 10% larger than diameter of the secondary coil. The opportunity to use two FOD scan areas enables detection of foreign objects relative to the power transfer coils regardless of any potential misalignment. In some implementations, a first detection apparatus may be utilized with the primary coil and a second detection apparatus may be used with the secondary coil.

Figure 17:
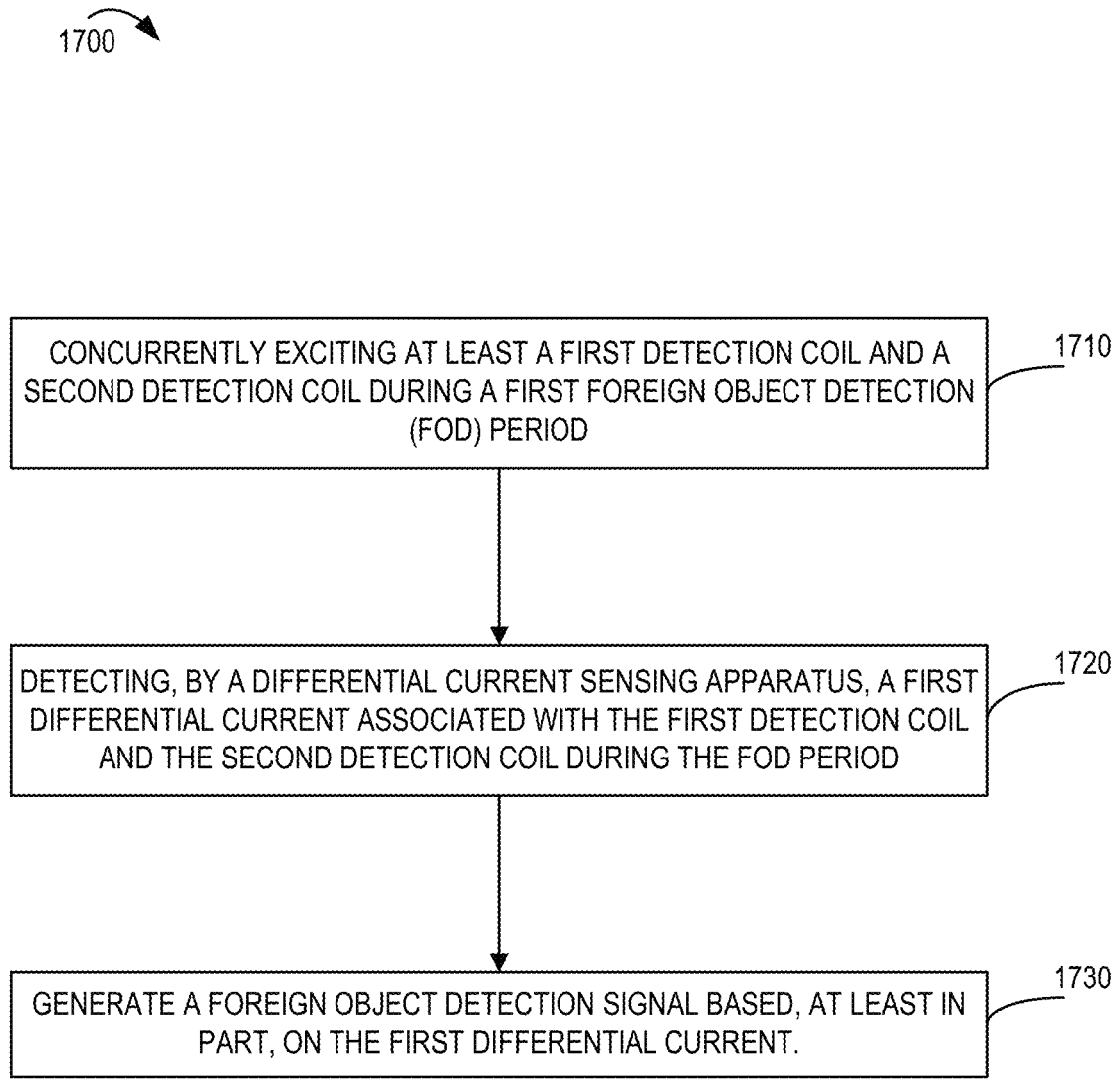
FIG. 17 shows a flowchart diagram of an example process for detecting a foreign object in accordance with some implementations.

FIG. 17 shows a flowchart diagram of an example process 1700 for detecting a foreign metal object in accordance with some implementations. The operations of the process 1700 may be implemented by a detection apparatus as described herein. For example, the operations of process 1700 may be implemented by a detection apparatus described with reference to FIGS. 2-16. The detection apparatus may have detection coils in any of the arrangements and constructions described herein. For brevity, the operations are described as performed by an apparatus. At block 1710, the apparatus may concurrently excite at least a first detection coil and a second detection coil during a first FOD period. At block 1720, the apparatus may detect, by a differential current sensing apparatus, a first differential current associated with the first detection coil and the second detection coil during the FOD period. At block 1730, the apparatus may generate a foreign object detection signal based, at least in part, on the first differential current.

Figure 18:
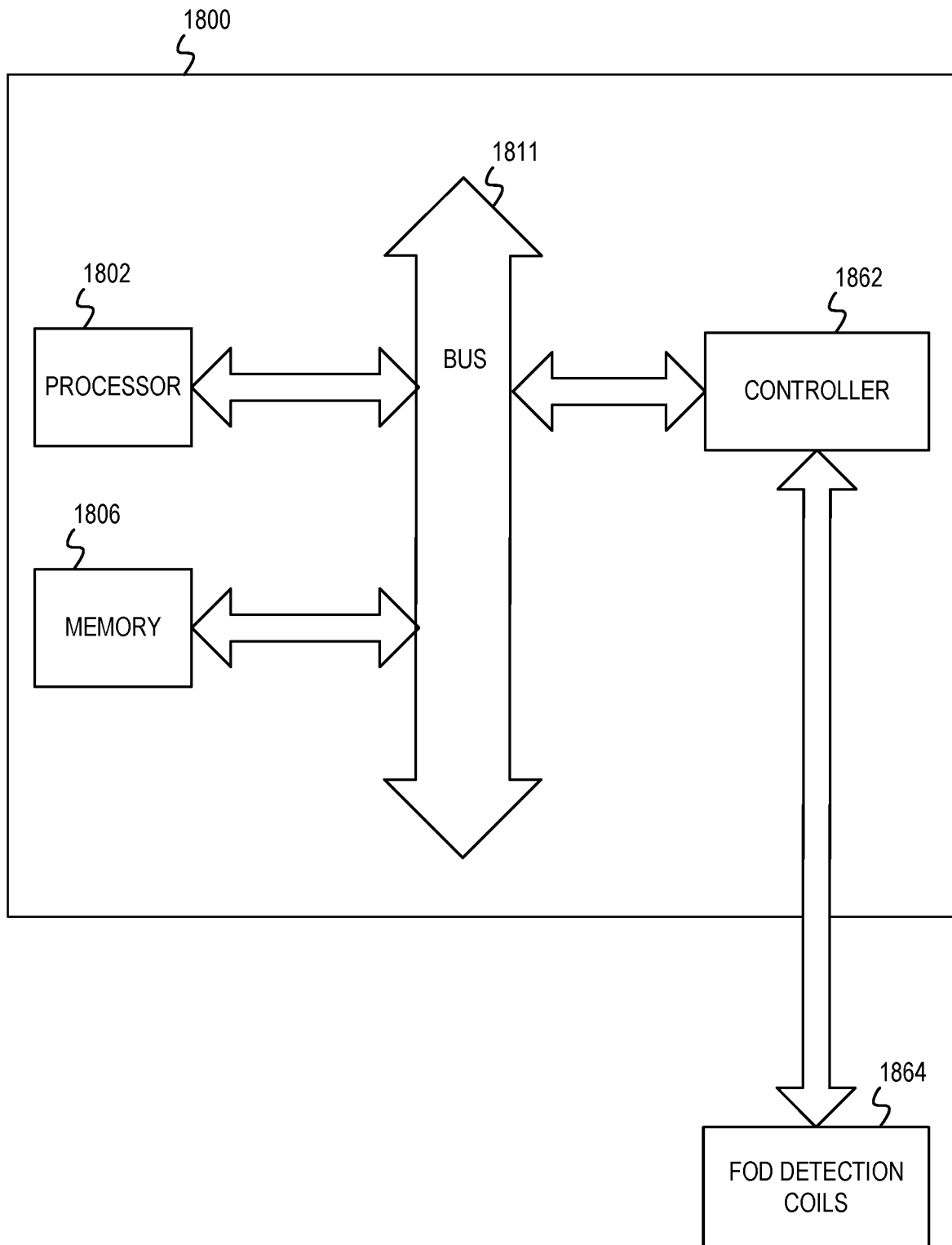
FIG. 18 shows a block diagram of an example apparatus for use in wireless power transfer system.

FIG. 18 shows a block diagram of an example apparatus 1800 for use in wireless power transfer system. In some implementations, the apparatus 1800 may be a detection apparatus, such as any of the detection apparatuses described herein. The apparatus 1800 can include a processor 1802 (possibly including multiple processors, multiple cores, multiple nodes, or implementing multi-threading, etc.). The apparatus 1800 also can include a memory 1806. The memory 1806 may be system memory or any one or more of the possible realizations of computer-readable media described herein. The apparatus 1800 also can include a bus 1811 (such as PCI, ISA, PCI-Express, HyperTransport®, InfiniBand®, NuBus®, AHB, AXI, etc.).

The apparatus 1800 may include one or more controller(s) 1862 configured to manage excitation of multiple detection coils (such as a coil array 1864). In some implementations, the controller(s) 1862 can be distributed within the processor 1802, the memory 1806, and the bus 1811. The controller(s) 1862 may perform some or all of the operations described herein. For example, the controller(s) 1862 may implement the features of a driver controller described herein.

The memory 1806 can include computer instructions executable by the processor 1802 to implement the functionality of the implementations described with reference to FIGS. 1-17. Any one of these functionalities may be partially (or entirely) implemented in hardware or on the processor 1802. For example, the functionality may be implemented with an application specific integrated circuit, in logic implemented in the processor 1802, in a co-processor on a peripheral device or card, etc. Further, realizations may include fewer or additional components not illustrated in FIG. 18. The processor 1802, the memory 1806, and the controller(s) 1862 may be coupled to the bus 1811. Although illustrated as being coupled to the bus 1811, the memory 1806 may be coupled to the processor 1802.

FIGS. 1-18 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

One innovative aspect of the subject matter described in this disclosure can be implemented as a detection apparatus of a wireless power transfer (WPT) system. The detection apparatus may include a plurality of detection coils including at least a first detection coil and a second detection coil. The detection apparatus may include a first driver configured to concurrently excite the first detection coil and the second detection coil during a first foreign object detection (FOD) period. The detection apparatus may include a differential current sensing apparatus configured to detect a first differential current associated with the first detection coil and the second detection coil during the FOD period. The detection apparatus may include a control unit configured to generate a foreign object detection signal based on the first differential current.

In some implementations, the detection apparatus may include a mat that includes the plurality of detection coils. The mat may be constructed for use in an interface space between a wireless power transmission apparatus and a wireless power reception apparatus.

In some implementations, the first differential current is based on a difference between a first current of the first detection coil and a second current of the second detection coil during the FOD period.

In some implementations, the differential current sensing apparatus includes at least a first magnetic core through which the first current of the first detection coil passes in a first direction and the second current of the second detection coil passes in a second direction such that the difference in the first current and second current generates a flux linkage in the first magnetic core representative of the first differential current.

In some implementations, the differential current sensing apparatus further includes a first differential current sensing circuit that includes a first sensor coil wound around the first magnetic core. The first magnetic core may be configured to induce a first electrical signal in the first sensor coil based on the flux linkage. A magnitude of the induced voltage of the first electrical signal may be based on a magnitude of the first differential current.

In some implementations, the differential current sensing circuit further includes a rectifier configured to rectify the first electrical signal to a direct current (DC) signal having a first detection voltage. The differential current sensing circuit may include a filter configured to stabilize the first detection voltage of the DC signal.

In some implementations, the control unit is configured to add or subtract a first offset to the first detection voltage to generate a first calibrated detection voltage.

In some implementations, the control unit is configured to compare an absolute value of the first calibrated detection voltage with a detection threshold. The foreign object detection signal may indicate a foreign object is present when the first calibrated detection voltage is above the detection threshold. The foreign object detection signal may indicate that the foreign object is not present when the first calibrated detection voltage is below the detection threshold.

In some implementations, the foreign object detection signal may indicate a foreign object is present when a change in the first calibrated detection voltage is above the delta threshold. The foreign object detection signal may indicate that the foreign object is not present when a change in the first calibrated detection voltage is below the delta threshold.

In some implementations, the first detection coil and the second detection coil are positioned in respective detection zones in an interface space of the WPT system.

In some implementations, the detection zones are symmetrically located with regard to either or both of a primary coil or a secondary coil of the WPT system.

In some implementations, the plurality of detection coils includes one or more coil pairs, each coil pair having at least two associated detection coils connected in parallel to a driver. A first coil pair may include the first detection coil and the second detection coil.

In some implementations, each coil pair is associated with at least two detection zones in an interface space of the WPT system.

In some implementations, the one or more coil pairs include the first coil pair that includes the first detection coil and the second detection coil in a first detection zone and a second detection zone, respectively. In some implementations, the detection apparatus includes a second coil pair that includes a third detection coil and a fourth detection coil in a third detection zone and a fourth detection zone, respectively.

In some implementations, the one or more coil pairs further include a third coil pair that includes a fifth detection coil and sixth detection coil in a fifth detection zone and a sixth detection zone, respectively.

In some implementations, the one or more coil pairs further include a fourth coil pair that includes a seventh detection coil and an eighth detection coil in a seventh detection zone and an eighth detection zone, respectively.

In some implementations, the detection apparatus may include a driver controller configured to control drivers associated with the one or more coil pairs such that the drivers concurrently excite the at least two associated detection coils of each coil pair during a respective FOD period. The differential current sensing apparatus may be configured to detect a corresponding differential current associated with each coil pair during the respective FOD period. The control unit may be configured to generate the foreign object detection signal based on the corresponding differential current associated with each coil pair.

In some implementations, the driver controller is configured to cause the drivers to excite the one or more coil pairs in a consecutive pattern such that one coil pair is excited during each respective FOD period.

In some implementations, the driver controller is configured to cause the drivers to excite the one or more coil pairs in a predetermined pattern such that two or more coil pairs are excited during each respective FOD period. The two or more coil pairs in each respective FOD period may be in non-adjacent detection zones.

In some implementations, the differential current sensing apparatus includes a plurality of differential current sensing circuits configured to obtain a plurality of detection voltages, each detection voltage corresponding to a differential current of a respective coil pair. The plurality of detection voltages may include at least a first detection voltage of a magnitude that is based on the first differential current of the first coil pair and a second detection voltage of magnitude dependent on the second differential current of the second coil pair.

In some implementations, the control unit is configured to adjust the plurality of detection voltages based on a set of offset values. The set of offset values may include at least a first offset value for the first detection voltage and a second offset value for the second detection voltage.

In some implementations, the set of offset values are initially based on a baseline measurement of impedance differences between the at least two associated detection coils for each coil pair.

In some implementations, the control unit is configured to detect changes in the plurality of detection voltages over successive FOD periods for each detection voltage. The control unit may be configured determine a change count representing a quantity of the plurality of detection voltages that have changed over the successive FOD periods for each detection voltage.

In some implementations, the control unit is configured to determine whether the changes in the plurality of detection voltages are caused by movement of a wireless power reception apparatus in the WPT system based on the change count.

In some implementations, the control unit is configured to determine that the changes in the plurality of detection voltages are caused by movement of the wireless power reception apparatus when the change count is above or equal to a count threshold. The control unit may determine that the changes in the plurality of detection voltages are caused by a presence of a foreign object when the change count is below the count threshold.

In some implementations, the control unit is configured to determine a ratio of the change count and a total count of the plurality of detection voltages. The control unit may be configured to determine that the changes in the plurality of detection voltages are caused by movement of the wireless power reception apparatus when the ratio is above or equal to a ratio threshold. The control unit may determine that the changes in the plurality of detection voltages are caused by a presence of a foreign object when the ratio is below the ratio threshold.

In some implementations, the control unit is configured to modify the set of offset values based on the changes in the plurality of detection voltages when the control unit determines that the changes in the plurality of detection voltages is caused by movement of the wireless power reception apparatus in the WPT system.

In some implementations, the control unit is configured to continuously calibrate the set of offset values to account for movement of the wireless power reception apparatus in the WPT system.

In some implementations, the plurality of detection coils includes identically shaped detection coils.

In some implementations, each of the at least two associated detection coils in each coil pair has a triangular shape or a sector shape such that when the plurality of detection coils are placed in corresponding detection zones. The plurality of detection coils may form a polygon or circle shaped FOD scan area.

In some implementations, the plurality of detection coils includes one or more coil pairs having a first shape and one or more other coil pairs having a second shape.

In some implementations, the first shape is substantially a trapezoidal shape or an annulus sector shape such that, when placed in corresponding detection zones, the one or more coil pairs of the first shape form part of a polygon or circle shaped FOD scan area excluding a center area of the FOD scan area. The second shape may be substantially a triangular or a sector shape combined with a polygonal shape or a sector shape such that, when placed in corresponding detection zones, the one or more other coil pairs of the second shape complete the polygon or circle shaped FOD scan area including the center area of the FOD scan area.

In some implementations, the first detection coil and the second detection coil of the first coil pair are constructed to cover a triangular or a sector shaped portion of an FOD scan area and a center area of the FOD scan area. Remaining ones of the plurality of detection coils may cover a trapezoidal or an annulus sector shaped portions, such that the plurality of detection coils form part of a polygon or circle shaped FOD scan area in which the center area is associated with the first coil pair.

In some implementations, each detection coil of the plurality of detection coils is larger than a size of a reference foreign object.

In some implementations, each detection coil of the plurality of detection coils is a size larger enough that a reference foreign object cannot simultaneously span more than two coil pairs.

In some implementations, each detection coil of the plurality of detection coils is formed from sub coils connected in series to form a single detection coil.

In some implementations, each sub coil is adjacent to one or more other sub coils to form an overall coverage area for the single detection coil.

In some implementations, the single detection coil is constructed such that adjacent sub coils are wound in opposite directions thereby reducing an effect of a primary magnetic field of the WPT system on the single detection coil.

In some implementations, each detection coil of the plurality of detection coils includes a series capacitance configured to reduce an effect of a primary magnetic field of the WPT system.

In some implementations, the plurality of detection coils are constructed by litz wire.

In some implementations, the plurality of detection coils are constructed on a printed circuit board (PCB).

In some implementations, the plurality of detection coils, when excited, are operated at an FOD scan frequency that is above a power transfer frequency of the WPT system.

In some implementations, the FOD scan frequency is 200 kilohertz (kHz) or greater. The power transfer frequency of the WPT system may be less than or equal to 50 kHz.

In some implementations, the plurality of detection coils is arranged to cover a plurality of detection zones. The plurality of detection zones may form an FOD scan area that is at least a threshold size larger than a combined surface area of a primary coil and a secondary coil of the WPT system.

In some implementations, the threshold size is determined based on a diameter of a larger one of the primary coil and the secondary coil.

In some implementations, the threshold size is based on a diameter of a largest secondary coil supported by the WPT system.

In some implementations, the threshold size is at least 10% greater than the diameter of a larger one of the primary coil and a largest secondary coil supported by the WPT system.

In some implementations, the threshold size is further based on a maximum misalignment tolerance permitted between the primary coil and the secondary coil before wireless power transfer is disabled.

In some implementations, the plurality of detection coils is arranged to cover a plurality of detection zones. The plurality of detection zones may be selectively enabled or disabled by the control unit to form a dynamic FOD scan area.

In some implementations, the control unit is further configured to determine the dynamic FOD scan area based on potential combined surface area of a primary coil and a secondary coil of the WPT system.

In some implementations, the dynamic FOD scan area large is enough to cover a maximum misalignment tolerance permitted between the primary coil and the secondary coil as well as an additional adjacent surface area.

In some implementations, the additional adjacent surface area causes the dynamic FOD scan area to be at least 10% larger in diameter than a largest diameter among the primary coil and the secondary coil supported by the WPT system including the maximum misalignment tolerance.

In some implementations, a first subset of the plurality of detection coils are on a wireless power transmission apparatus of the WPT system and a second subset of the plurality of detection coils are on the wireless power reception apparatus of the WPT system.

Another innovative aspect of the subject matter described in this disclosure can be implemented as a detection apparatus of a wireless power transfer (WPT) system. The detection apparatus may include a plurality of detection coils arranged to form a foreign object detection (FOD) scan area that is at least a threshold size larger than a potential surface area of a plurality of power transfer coils of a wireless power transfer (WPT) system. The detection apparatus may include a control unit configured to generate a foreign object detection signal based on a detection of a foreign object in the FOD scan area.

In some implementations, the plurality of power transfer coils includes a primary coil of a wireless power transmission apparatus and a secondary coil of a wireless power reception apparatus. The threshold size may be determined based on a diameter of a larger one of the primary coil and the secondary coil.

In some implementations, the threshold size is based on a diameter of a largest secondary coil supported by the WPT system.

In some implementations, the threshold size is at least 10% greater than the diameter of a larger one of the primary coil and a largest secondary coil supported by the WPT system.

In some implementations, the threshold size is further based on a maximum misalignment tolerance that the WPT system permits for misalignment of the primary coil and the secondary coil.

In some implementations, a first subset of the plurality of detection coils are arranged on or in a wireless power transmission apparatus of the WPT system and a second subset of the plurality of detection coils are arranged on or in a wireless power reception apparatus of the WPT system.

Another innovative aspect of the subject matter described in this disclosure can be implemented as a system. The system includes a wireless power transmission apparatus including at least one primary coil and a first plurality of detection coils arranged to form a first foreign object detection (FOD) scan area that is at least a first size larger than a size of the primary coil. The system may include a wireless power reception apparatus including at least one secondary coil and a second plurality of detection coils arranged to form a second FOD scan area that is at least a second size larger than a size of the secondary coil.

In some implementations, the first size of the first FOD scan area is based on a diameter of the primary coil. The second size of the second FOD scan area may be based on a diameter of the secondary coil.

In some implementations, the first size is at least 10% larger than a diameter of the primary coil, and the second size is at least 10% larger than a diameter of the secondary coil.

Another innovative aspect of the subject matter described in this disclosure can be implemented as a method of a detection apparatus for use in a wireless power transfer (WPT) system. The method may include concurrently exciting at least a first detection coil and a second detection coil during a first foreign object detection (FOD) period. The method may include detecting, by a differential current sensing apparatus, a first differential current associated with the first detection coil and the second detection coil during the FOD period. The method may include generating a foreign object detection signal based on the first differential current.

In some implementations, the first differential current is based on a difference between a first current of the first detection coil and a second current of the second detection coil during the FOD period.

In some implementations, detecting the first differential current includes passing the first current of the first detection coil in a first direction through a first magnetic core and the second current of the second detection coil in a second direction through the first magnetic core such that the difference in the first current and second current generates a flux linkage in the first magnetic core representative of the first differential current.

In some implementations, the first magnetic core is configured to induce a first electrical signal in a first sensor coil based on the flux linkage. A magnitude of the induced voltage of the first electrical signal may be based on a magnitude of the first differential current.

In some implementations, the method may include rectifying the first electrical signal to a direct current (DC) signal having a first detection voltage. The method may include stabilizing, by a filter, the first detection voltage of the DC signal.

In some implementations, the method may include adding or subtracting a first offset to the first detection voltage to generate a first calibrated detection voltage.

In some implementations, the method may include comparing an absolute value of the first calibrated detection voltage with a detection threshold to determine the foreign object detection signal. The foreign object detection signal may indicate a foreign object is present when the first calibrated detection voltage is above the detection threshold. The foreign object detection signal may indicate that the foreign object is not present when the first calibrated detection voltage is below the detection threshold.

In some implementations, the first detection coil and the second detection coil are positioned in respective detection zones in an interface space of the WPT system.

In some implementations, the detection zones are symmetrically located with regard to either or both of a primary coil or a secondary coil of the WPT system.

In some implementations, the detection apparatus includes a plurality of detection coils organized as one or more coil pairs, each coil pair having at least two associated detection coils connected in parallel to a driver. A first coil pair may include the first detection coil and the second detection coil.

In some implementations, each coil pair is associated with at least two detection zones in an interface space of the WPT system.

In some implementations, the method may include concurrently exciting the at least two associated detection coils of each coil pair during a respective FOD period. The method may include detecting a corresponding differential current associated with each coil pair during the respective FOD period. The method may include generating the foreign object detection signal based on the corresponding differential current associated with each coil pair.

In some implementations, the method may include exciting the one or more coil pairs in a consecutive pattern such that one coil pair is excited during each respective FOD period.

In some implementations, the method may include exciting the one or more coil pairs in a predetermined pattern such that two or more coil pairs are excited during each respective FOD period. The two or more coil pairs may be in each respective FOD period are in non-adjacent detection zones.

In some implementations, the method may include obtaining, by a plurality of differential current sensing circuits, a plurality of detection voltages. Each detection voltage may correspond to a differential current of a respective coil pair. The plurality of detection voltages may include at least a first detection voltage of a magnitude that is based on the first differential current of the first coil pair and a second detection voltage of magnitude dependent on the second differential current of the second coil pair.

In some implementations, the method may include adjusting the plurality of detection voltages based on a set of offset values. The set of offset values may include at least a first offset value for the first detection voltage and a second offset value for the second detection voltage.

In some implementations, the set of offset values are initially based on a baseline measurement of impedance differences between the at least two associated detection coils for each coil pair.

In some implementations, the method may include detecting changes in the plurality of detection voltages over successive FOD periods for each detection voltage. The method may include determining a change count representing a quantity of the plurality of detection voltages that have changed over the successive FOD periods for each detection voltage.

In some implementations, the method may include determining whether the changes in the plurality of detection voltages are caused by movement of a wireless power reception apparatus in the WPT system based on the change count.

In some implementations, the method may include determining that the changes in the plurality of detection voltages are caused by movement of the wireless power reception apparatus when the change count is above or equal to a count threshold. The method may include determining that the changes in the plurality of detection voltages are caused by a presence of a foreign object when the change count is below the count threshold.

In some implementations, the method may include determining a ratio of the change count and a total count of the plurality of detection voltages. The method may include determining that the changes in the plurality of detection voltages are caused by movement of the wireless power reception apparatus when the ratio is above or equal to a ratio threshold. The method may include determining that the changes in the plurality of detection voltages are caused by a presence of a foreign object when the ratio is below the ratio threshold.

In some implementations, the method may include modifying the set of offset values based on the changes in the plurality of detection voltages when the control unit determines that the changes in the plurality of detection voltages is caused by movement of the wireless power reception apparatus in the WPT system.

In some implementations, the method may include continuously calibrating the set of offset values to account for movement of the wireless power reception apparatus in the WPT system.

The figures, operations, and components described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A detection apparatus for foreign object detection (FOD), the detection apparatus comprising:
    a plurality of detection coils that collectively form an FOD scan area, wherein the plurality of detection coils are arranged in pairs of detection coils that are symmetrically located relative to a primary coil of a wireless power transmission apparatus, and wherein each pair includes two detection coils that are identically shaped as each other and have same or similar impedance when a foreign object is not present;
    one or more sensors configured to sense differential currents associated with the two detection coils in each pair when the two detection coils are concurrently excited by a same voltage; and
    a control unit configured to detect a presence of the foreign object based on one or more of the differential currents being above a differential current threshold.

2. The detection apparatus of claim 1, wherein each pair of detection coils is associated with at least two detection zones of the FOD scan area.

3. The detection apparatus of claim 2, wherein the pairs of detection coils include:
    a first pair that includes a first detection coil (L1) and a second detection coil (L2) in a first detection zone and a second detection zone, respectively; and
    a second pair that includes a third detection coil (L3) and a fourth detection coil (L4) in a third detection zone and a fourth detection zone, respectively;
    a third pair that includes a fifth detection coil (L5) and sixth detection coil (L6) in a fifth detection zone and a sixth detection zone, respectively; and
    a fourth pair that includes a seventh detection coil (L7) and an eighth detection coil (L8) in a seventh detection zone and an eighth detection zone, respectively.

4. The detection apparatus of claim 1, wherein the plurality of detection coils collectively form a polygon or circle shape to cover the FOD scan area.

5. The detection apparatus of claim 4, wherein each of the plurality of detection coils has a triangular shape or a sector shape.

6. The detection apparatus of claim 4, wherein the plurality of detection coils includes one or more pairs having detection coils of a first shape and one or more other pairs having detection coils of a second shape.

7. The detection apparatus of claim 6,
    wherein the first shape is substantially a trapezoidal shape or an annulus sector shape such that, when placed in corresponding detection zones, the detection coils of the first shape form part of a polygon or circle shaped area excluding a center area of the FOD scan area; and
    wherein the second shape is substantially a triangular or a sector shape combined with a polygonal shape or a sector shape such that, when placed in corresponding detection zones, the detection coils of the second shape complete the polygon or circle shaped area and the center area of the FOD scan area.

8. The detection apparatus of claim 1, wherein each detection coil of the plurality of detection coils is larger than a size of a reference foreign object.

9. The detection apparatus of claim 1, wherein each detection coil of the plurality of detection coils is a size large enough that a reference foreign object cannot simultaneously span more than two pairs of detection coils.

10. The detection apparatus of claim 1, wherein each detection coil of the plurality of detection coils is formed from sub coils connected in series to form a single detection coil.

11. The detection apparatus of claim 10, wherein each sub coil of the sub coils is adjacent to one or more other sub coils to form an overall coverage area for the single detection coil.

12. The detection apparatus of claim 10, wherein the single detection coil is constructed such that adjacent sub coils are wound in opposite directions thereby reducing an effect of a primary magnetic field of the wireless power transmission apparatus on the single detection coil.

13. The detection apparatus of claim 1, wherein each detection coil of the plurality of detection coils includes a series capacitance configured to reduce an effect of a primary magnetic field of the wireless power transmission apparatus on each detection coil.

14. The detection apparatus of claim 1, wherein the plurality of detection coils are constructed on a printed circuit board (PCB) or using Litz wires.

15. The detection apparatus of claim 1, further comprising:
    one or more drivers configured to excite pairs of detection coils at an excitation frequency that is above a power transfer frequency, and wherein the excitation frequency is 200 kilohertz (kHz) or greater.

16. A foreign object detection (FOD) system, comprising:
    an FOD mat including a plurality of detection coils associated with a corresponding plurality of detection zones in an FOD scan area;
    the plurality of detection coils arranged in pairs of detection coils that are symmetrically located relative to a primary coil of a wireless power transmission apparatus, the pairs of detection coils including at least a first pair of detection coils and a second pair of detection coils;
    the first pair of detection coils including two detection coils that are identically shaped as a first shape, wherein the first pair forms part of the FOD scan area excluding a center area of the FOD scan area; and
    the second pair of detection coils including two other detection coils that are identically shaped as a second shape, wherein the second pair forms another part of the FOD scan area including the center area of the FOD scan area, wherein the plurality of detection coils collectively forms the FOD scan area.

17. The FOD system of claim 16, wherein
    the first shape is substantially a trapezoidal shape or an annulus sector shape, and
    the second shape is substantially a triangular or a sector shape combined with a polygonal shape or a sector shape to include the center area.

18. The FOD system of claim 16, wherein the first shape and the second shape are designed to reduce a concentration of detection coils at the center area of the FOD scan area.

19. The FOD system of claim 16, wherein each detection coil of the plurality of detection coils includes:
    a plurality of sub coils connected in series, each sub coil of the plurality of sub coils positioned adjacent to one or more other sub coils such that adjacent sub coils are wound in opposite directions; and
    a series capacitance configured to reduce an effect of a primary magnetic field of the wireless power transmission apparatus on each detection coil.

20. The FOD system of claim 16, further comprising:
one or more sensors configured to sense differential currents associated with two detection coils in each pair when the two detection coils are concurrently excited by a same voltage; and
a control unit configured to detect a presence of a foreign object based on one or more of the differential currents being above a differential current threshold.

\* \* \* \* \*